(12) United States Patent
Zhuang

(10) Patent No.: US 10,810,091 B2
(45) Date of Patent: Oct. 20, 2020

(54) DATA RECOVERY METHOD, DATA STORAGE METHOD, AND CORRESPONDING APPARATUS AND SYSTEM

(71) Applicant: Huawei Technologies Co., Ltd., Shenzhen (CN)

(72) Inventor: Shiyue Zhuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 15/893,201

(22) Filed: Feb. 9, 2018

(65) Prior Publication Data

US 2018/0165164 A1 Jun. 14, 2018

Related U.S. Application Data

(63) Continuation of application No. PCT/CN2016/071339, filed on Jan. 19, 2016.

(30) Foreign Application Priority Data

Aug. 17, 2015 (CN) .......................... 2015 1 0504685

(51) Int. Cl.
  *G06F 11/14* (2006.01)
  *G06F 16/182* (2019.01)
  *G06F 11/10* (2006.01)

(52) U.S. Cl.
  CPC ...... *G06F 11/1469* (2013.01); *G06F 11/1076* (2013.01); *G06F 11/14* (2013.01); *G06F 16/182* (2019.01)

(58) Field of Classification Search
  CPC .... G06F 9/5066; G06F 16/178; G06F 16/182; G06F 16/1844; G06F 16/2471;
  (Continued)

(56) References Cited

U.S. PATENT DOCUMENTS

| 4,887,204 A * | 12/1989 | Johnson .............. G06F 12/0813 |
| 7,240,236 B2 | 7/2007 | Cutts et al. |
| 7,636,724 B2 | 12/2009 | De La Torre et al. |
| 8,719,232 B2 | 5/2014 | Essawi et al. |

(Continued)

FOREIGN PATENT DOCUMENTS

| CN | 101488104 A | 7/2009 |
| CN | 101630282 A | 1/2010 |

(Continued)

OTHER PUBLICATIONS

Machine Translation and Abstract of Chinese Publication No. CN101488104, Jul. 22, 2009, 20 pages.

(Continued)

*Primary Examiner* — Angelica Ruiz

(74) *Attorney, Agent, or Firm* — Conley Rose, P.C.

(57) ABSTRACT

A data recovery method in a distributed storage system including a NameNode, a plurality of first storage nodes and a plurality of second storage nodes, where each of the first storage nodes includes a data processing apparatus communicatively coupled to the NameNode. The data processing apparatus receives a file block obtaining request carrying an identifier of a target file, determines that a target file block is lost according to the identifier of the target file, obtains, from the NameNode, an identifier of a target storage node on which a recovery dependence data block is located, and obtains the recovery dependence data block according to the identifier of the target storage node and the identifier of the target file to recover the target file block.

16 Claims, 10 Drawing Sheets

(58) Field of Classification Search
CPC ........ G06F 16/27; G06F 16/10; G06F 9/5072; G06F 16/1827; G06F 3/067; G06F 11/1446; G06F 11/2094
USPC ........... 707/600–831, 899, 999.001–999.206
See application file for complete search history.

(56) References Cited

U.S. PATENT DOCUMENTS

| | | | |
|---|---|---|---|
| 8,756,473 B1 | 6/2014 | Marrow et al. | |
| 2012/0066469 A1 | 3/2012 | Yochai et al. | |
| 2012/0278578 A1* | 11/2012 | Castillo | G06F 12/02 711/165 |
| 2013/0151884 A1* | 6/2013 | Hsu | G06F 11/2035 714/4.11 |
| 2013/0227558 A1* | 8/2013 | Du | H04L 67/18 718/1 |
| 2015/0067004 A1* | 3/2015 | Shvachko | G06F 16/182 707/827 |
| 2015/0112946 A1* | 4/2015 | Kao | G06F 11/1469 707/654 |
| 2015/0112951 A1* | 4/2015 | Narayanamurthy | G06F 16/172 707/694 |
| 2015/0278244 A1* | 10/2015 | Shvachko | G06F 16/178 707/634 |

FOREIGN PATENT DOCUMENTS

| | | |
|---|---|---|
| CN | 102750195 A | 10/2012 |
| CN | 103023968 A | 4/2013 |
| CN | 103605582 A | 2/2014 |
| CN | 103645861 A | 3/2014 |
| CN | 103699494 A | 4/2014 |

OTHER PUBLICATIONS

Machine Translation and Abstract of Chinese Publication No. CN103023968, Apr. 3, 2013, 7 pages.
Machine Translation and Abstract of Chinese Publication No. CN103699494, Apr. 2, 2014, 10 pages.
Foreign Communication From a Counterpart Application, Chinese Application No. 201510504685.8, Chinese Office Action dated Apr. 24, 2018, 5 pages.
Foreign Communication From a Counterpart Application, European Application No. 16836360.4, Extended European Search Report dated Apr. 26, 2018, 8 pages.
Machine Translation and Abstract of Chinese Publication No. CN101630282, Jan. 20, 2010, 13 pages.
Machine Translation and Abstract of Chinese Publication No. CN102750195, Oct. 24, 2012, 7 pages.
Machine Translation and Abstract of Chinese Publication No. CN103605582, Feb. 26, 2014, 17 pages.
Machine Translation and Abstract of Chinese Publication No. CN103645861, Mar. 19, 2014, 14 pages.
Foreign Communication From a Counterpart Application, PCT Application No. PCT/CN2016/071339, English Translation of International Search Report dated May 19, 2016, 2 pages.

* cited by examiner

A data processing apparatus receives identifiers of multiple target storage nodes and an identifier of a target file that are sent by a NameNode, where the multiple target storage nodes are first storage nodes that have stored file blocks of the target file, the data processing apparatus is applied to a distributed storage system, and the distributed storage system includes the NameNode, multiple first storage nodes, and multiple second storage nodes, where the multiple first storage nodes store file blocks of a file in a distributed manner, the multiple second storage nodes store, in a distributed manner, check code blocks obtained by coding the file blocks, each of the second storage nodes includes a data processing apparatus, and each data processing apparatus is communicatively connected to the NameNode ⟋— 201

↓

The data processing apparatus codes a part of file blocks of the target file according to the identifiers of the target storage nodes and a partial byte coding function to obtain a first check code, where the partial byte coding function is a function that obtains a coding result by coding the part of file blocks of the target file ⟋— 202

↓

The data processing apparatus codes all file blocks of the target file according to the identifiers of the target storage nodes and a full byte coding function to obtain a second check code, where the full byte coding function is a function that obtains a coding result by coding all the file blocks of the target file ⟋— 203

↓

The data processing apparatus stores the first check code and the second check code in storage space of the second storage node to which the data processing apparatus belongs ⟋— 204

FIG. 7

DATA RECOVERY METHOD, DATA STORAGE METHOD, AND CORRESPONDING APPARATUS AND SYSTEM

CROSS-REFERENCE TO RELATED APPLICATIONS

This application is a continuation of International Patent Application No. PCT/CN2016/071339 filed on Jan. 19, 2016, which claims priority to Chinese Patent Application No. 201510504685.8 filed on Aug. 17, 2015. The aforementioned patent applications are hereby incorporated by reference in their entireties.

TECHNICAL FIELD

The present disclosure relates to the field of data storage technologies, and in particular, to a data recovery method, a data storage method, and a corresponding apparatus and system.

BACKGROUND

In a large-capacity distributed storage system, a multi-copy solution may be used to improve data storage reliability. That is, data in a disk is copied into multiple duplicate disks, when any disk in the multiple duplicate disks is invalid, the data is read from any other surviving disk and is placed into a new disk, and data recovery is completed. This technology is simple to implement and takes the least time for recovery, but has high storage overheads.

To resolve a problem of high storage overheads in the multi-copy solution, an erasure code such as Reed-Solomon Code (RS) emerges. For example, RS (10, 4) means that data in ten disks is coded, and generated coding results are stored in four redundant disks. In this case, storage overheads are (10+4)/10=1.4 times, and the storage overheads are significantly reduced when compared with those in the multi-copy solution. However, when a disk is invalid, data needs to be read from the ten disks and decoded to implement data recovery. However, in the multi-copy solution, recovery can be implemented by reading data from only one disk, by contrast, network bandwidth overheads of the RS technology increases by ten times, and high network overheads are a disadvantage of the RS technology.

It can be seen that, a distributed storage solution in other approaches has either high storage overheads or high network bandwidth overheads in data recovery.

SUMMARY

Embodiments of the present disclosure provide a data recovery method in order to reduce network bandwidth overheads in data recovery on the premise of low storage overheads. The embodiments of the present disclosure further provide a corresponding data storage method and a corresponding apparatus and system.

A first aspect of the present disclosure provides a data recovery method, where the method is applied to a distributed storage system. The distributed storage system includes a NameNode, multiple first storage nodes, and multiple second storage nodes. The multiple first storage nodes store file blocks of a file in a distributed manner. The multiple second storage nodes store, in a distributed manner, check code blocks obtained by coding the file blocks, each of the first storage nodes includes a data processing apparatus, each data processing apparatus is communicatively connected to the NameNode, and the method includes receiving, by the data processing apparatus, a file block obtaining request sent by user equipment, where the file block obtaining request carries an identifier of a target file, determining, by the data processing apparatus, that a target file block is lost when the data processing apparatus fails to find the target file block according to the identifier of the target file, obtaining, from the NameNode by the data processing apparatus, an identifier of a target storage node on which a recovery dependence data block is located, obtaining the recovery dependence data block according to the identifier of the target storage node and the identifier of the target file, where the recovery dependence data block includes a dependence file block and a dependence check code block that are needed for recovering the target file block, a part of check codes in the dependence check code block are obtained by coding a part of file blocks of the target file, a remaining part of check codes in the dependence check code block are obtained by coding all file blocks of the target file, the remaining part of check codes are a check code other than the part of check codes, and the target file is a file to which the target file block belongs, and recovering, by the data processing apparatus, the target file block according to the dependence file block and the dependence check code block.

With reference to the first aspect, in a first possible implementation manner, recovering, by the data processing apparatus, the target file block according to the dependence file block and the dependence check code block includes recovering, by the data processing apparatus, a first byte in the target file block according to a partial byte coding function, the dependence file block, and the dependence check code block, where the partial byte coding function is a function that obtains a coding result by coding the part of file blocks of the target file, and recovering, by the data processing apparatus, a second byte in the target file block according to a full byte coding function, the dependence file block, and the dependence check code block, where the full byte coding function is a function that obtains a coding result by coding all the file blocks of the target file.

With reference to the first possible implementation manner of the first aspect, in a second possible implementation manner, recovering, by the data processing apparatus, a first byte in the target file block according to a partial byte coding function, the dependence file block, and the dependence check code block includes obtaining, from a dependence file block corresponding to a first coding parameter by the data processing apparatus, a dependence byte needed for recovering the first byte, and obtaining, from a dependence check code block corresponding to a first coding result, a check code needed for recovering the first byte, where the first coding parameter is a coding parameter in the partial byte coding function, and the first coding result is a result obtained by coding, using the partial byte coding function, the first byte and a dependence byte that is indicated by the first coding parameter, and decoding, by the data processing apparatus according to the dependence byte needed for recovering the first byte, the check code needed for recovering the first byte to obtain the first byte.

With reference to the first or the second possible implementation manner of the first aspect, in a third possible implementation manner, recovering, by the data processing apparatus, a second byte in the target file block according to a full byte coding function, the dependence file block, and the dependence check code block includes obtaining, from a dependence file block corresponding to a second coding parameter by the data processing apparatus, a dependence byte needed for recovering the second byte, and obtaining, from a dependence check code block corresponding to a second coding result, a check code needed for recovering the second byte, where the second coding parameter is a coding parameter in the full byte coding function, and the second coding result is a result obtained by coding, using the full byte coding function, the second byte and a dependence byte that is indicated by the second coding parameter, and decoding, by the data processing apparatus according to the dependence byte needed for recovering the second byte, the check code needed for recovering the second byte, to obtain the second byte.

A second aspect of the present disclosure provides a data storage method, where the method is applied to a distributed storage system, the distributed storage system includes a NameNode, multiple first storage nodes, and multiple second storage nodes, the multiple first storage nodes store file blocks of a file in a distributed manner, the multiple second storage nodes store, in a distributed manner, check code blocks obtained by coding the file blocks, each of the second storage nodes includes a data processing apparatus, each data processing apparatus is communicatively connected to the NameNode, and the method includes receiving, by the data processing apparatus, identifiers of multiple target storage nodes and an identifier of a target file that are sent by the NameNode, where the multiple target storage nodes are the first storage nodes that have stored file blocks of the target file, coding, by the data processing apparatus, a part of file blocks of the target file according to the identifiers of the target storage nodes and a partial byte coding function to obtain a first check code, where the partial byte coding function is a function that obtains a coding result by coding the part of file blocks of the target file, coding, by the data processing apparatus, all file blocks of the target file according to the identifiers of the target storage nodes and a full byte coding function to obtain a second check code, where the full byte coding function is a function that obtains a coding result by coding all the file blocks of the target file, and storing, by the data processing apparatus, the first check code and the second check code in storage space of the second storage node to which the data processing apparatus belongs.

With reference to the second aspect, in a first possible implementation manner, coding, by the data processing apparatus, a part of file blocks of the target file according to the identifiers of the target storage nodes and a partial byte coding function to obtain a first check code includes obtaining, by the data processing apparatus, a byte indicated by a first coding parameter from a target storage node corresponding to the first coding parameter, where the first coding parameter is each coding parameter in the partial byte coding function, and coding, by the data processing apparatus according to the partial byte coding function, the byte indicated by the first coding parameter to obtain the first check code.

With reference to the second aspect or the first possible implementation manner of the second aspect, in a second possible implementation manner, coding, by the data processing apparatus, all file blocks of the target file according to the identifiers of the target storage nodes and a full byte coding function to obtain a second check code includes obtaining, by the data processing apparatus, a byte indicated by a second coding parameter from a target storage node corresponding to the second coding parameter, where the second coding parameter is each coding parameter in the full byte coding function, and coding, by the data processing apparatus according to the full byte coding function, the byte indicated by the second coding parameter, to obtain the second check code.

With reference to the second aspect or the first possible implementation manner of the second aspect, in a third possible implementation manner, before coding, by the data processing apparatus, a part of file blocks of the target file according to the identifiers of the target storage nodes and a partial byte coding function to obtain a first check code, the method further includes determining, by the data processing apparatus according to a quantity of target storage nodes and a quantity of check nodes specified by the NameNode, a quantity of first parameters in the partial byte coding function and a quantity of same first parameters included in partial byte coding functions on two closely adjacent check nodes, where the partial byte coding functions included on the two closely adjacent check nodes have a maximum quantity of overlapped first parameters.

A third aspect of the present disclosure provides a data processing apparatus, where the apparatus is applied to a distributed storage system, the distributed storage system includes a NameNode, multiple first storage nodes, and multiple second storage nodes, the multiple first storage nodes store file blocks of a file in a distributed manner, the multiple second storage nodes store, in a distributed manner, check code blocks obtained by coding the file blocks, each of the first storage nodes includes a data processing apparatus, each data processing apparatus is communicatively connected to the NameNode, and the data processing apparatus includes a receiving module configured to receive a file block obtaining request sent by user equipment, where the file block obtaining request carries an identifier of a target file, a determining module configured to determine that a target file block is lost when the determining module fails to find the target file block according to the identifier that is of the target file and that is received by the receiving module, an obtaining module configured to obtain, from the NameNode, an identifier of a target storage node on which a recovery dependence data block is located after the determining module determines that the target file block is lost, and obtain the recovery dependence data block according to the identifier of the target storage node and the identifier of the target file, where the recovery dependence data block includes a dependence file block and a dependence check code block that are needed for recovering the target file block, a part of check codes in the dependence check code block are obtained by coding a part of file blocks of the target file, a remaining part of check codes in the dependence check code block are obtained by coding all file blocks of the target file, the remaining part of check codes are a check code other than the part of check codes, and the target file is a file to which the target file block belongs, and a recovery module configured to recover the target file block according to the dependence file block and the dependence check code block that are obtained by the obtaining module.

With reference to the third aspect, in a first possible implementation manner, the recovery module includes a first recovery unit configured to recover a first byte in the target file block according to a partial byte coding function, the dependence file block, and the dependence check code block, where the partial byte coding function is a function that obtains a coding result by coding the part of file blocks of the target file, and a second recovery unit configured to recover a second byte in the target file block according to a full byte coding function, the dependence file block, and the dependence check code block, where the full byte coding function is a function that obtains a coding result by coding all the file blocks of the target file.

With reference to the first possible implementation manner of the third aspect, in a second possible implementation manner, the first recovery unit is further configured to obtain, from a dependence file block corresponding to a first coding parameter, a dependence byte needed for recovering the first byte, obtain, from a dependence check code block corresponding to a first coding result, a check code needed for recovering the first byte, where the first coding parameter is a coding parameter in the partial byte coding function, and the first coding result is a result obtained by coding, using the partial byte coding function, the first byte and a dependence byte that is indicated by the first coding parameter, and decode, according to the dependence byte needed for recovering the first byte, the check code needed for recovering the first byte, to obtain the first byte.

With reference to the first or the second possible implementation manner of the third aspect, in a third possible implementation manner, the second recovery unit is further configured to obtain, from a dependence file block corresponding to a second coding parameter, a dependence byte needed for recovering the second byte, obtain, from a dependence check code block corresponding to a second coding result, a check code needed for recovering the second byte, where the second coding parameter is a coding parameter in the full byte coding function, and the second coding result is a result obtained by coding, using the full byte coding function, the second byte and a dependence byte that is indicated by the second coding parameter, and decode, according to the dependence byte needed for recovering the second byte, the check code needed for recovering the second byte to obtain the second byte.

A fourth aspect of the present disclosure provides a data processing apparatus, where the apparatus is applied to a distributed storage system, the distributed storage system includes a NameNode, multiple first storage nodes, and multiple second storage nodes, the multiple first storage nodes store file blocks of a file in a distributed manner, the multiple second storage nodes store, in a distributed manner, check code blocks obtained by coding the file blocks, each of the second storage nodes includes a data processing apparatus, each data processing apparatus is communicatively connected to the NameNode, and the data processing apparatus includes a receiving module configured to receive identifiers of multiple target storage nodes and an identifier of a target file that are sent by the NameNode, where the multiple target storage nodes are the first storage nodes that have stored file blocks of the target file, a first coding module configured to code a part of file blocks of the target file according to a partial byte coding function and the identifiers that are of the target storage nodes and are received by the receiving module to obtain a first check code, where the partial byte coding function is a function that obtains a coding result by coding the part of file blocks of the target file, a second coding module configured to code all file blocks of the target file according to a full byte coding function and the identifiers that are of the target storage nodes and are received by the receiving module to obtain a second check code, where the full byte coding function is a function that obtains a coding result by coding all the file blocks of the target file, and a storage scheduling module configured to store, in storage space of the second storage node to which the data processing apparatus belongs, the first check code obtained by the first coding module by means of coding and the second check code obtained by the second coding module by means of coding.

With reference to the fourth aspect, in a first possible implementation manner, the first coding module is further configured to obtain a byte indicated by a first coding parameter from a target storage node corresponding to the first coding parameter, where the first coding parameter is each coding parameter in the partial byte coding function, and code, according to the partial byte coding function, the byte indicated by the first coding parameter, to obtain the first check code.

With reference to the fourth aspect or the first possible implementation manner of the fourth aspect, in a second possible implementation manner, the second coding module is further configured to obtain a byte indicated by a second coding parameter from a target storage node corresponding to the second coding parameter, where the second coding parameter is each coding parameter in the full byte coding function, and code, according to the full byte coding function, the byte indicated by the second coding parameter to obtain the second check code.

With reference to the fourth aspect or the first possible implementation manner of the fourth aspect, in a third possible implementation manner, the data processing apparatus further includes a determining module configured to determine, according to a quantity of target storage nodes and a quantity of check nodes specified by the NameNode, a quantity of first parameters in the partial byte coding function and a quantity of same first parameters included in partial byte coding functions on two closely adjacent check nodes, where the partial byte coding functions included on the two closely adjacent check nodes have a maximum quantity of overlapped first parameters.

A fifth aspect of the present disclosure provides a distributed storage system that includes a NameNode, multiple first storage nodes, and multiple second storage nodes, where the multiple first storage nodes store file blocks of a file in a distributed manner, the multiple second storage nodes store, in a distributed manner, check code blocks obtained by coding the file blocks, each of the first storage nodes includes a first data processing apparatus, each of the second storage nodes includes a second data processing apparatus, and each first data processing apparatus and each second data processing apparatus are communicatively connected to the NameNode, the first data processing apparatus is the data processing apparatus according to the foregoing third aspect or any implementation manner of the third aspect, and the second data processing apparatus is the data processing apparatus according to the foregoing fourth aspect or any implementation manner of the fourth aspect.

The data recovery method provided in the embodiments of the present disclosure is applied to a distributed storage system, where the distributed storage system includes a NameNode, multiple first storage nodes, and multiple second storage nodes, the multiple first storage nodes store file blocks of a file in a distributed manner, the multiple second storage nodes store, in a distributed manner, check code blocks obtained by coding the file blocks, each of the first storage nodes includes a data processing apparatus, each data processing apparatus is communicatively connected to the NameNode. The method includes receiving, by the data processing apparatus, a file block obtaining request sent by user equipment, where the file block obtaining request carries an identifier of a target file, determining, by the data processing apparatus, that the target file block is lost when the data processing apparatus fails to find a target file block according to the identifier of the target file, obtaining, from the NameNode by the data processing apparatus, an identifier of a target storage node on which a recovery dependence data block is located, where the recovery dependence data block includes a dependence file block and a dependence check code block that are needed for recovering the target file block, a part of check codes in the dependence check code block are obtained by coding a part of file blocks of the target file, a remaining part of check codes in the dependence check code block are obtained by coding all file blocks of the target file, the remaining part of check codes are a check code other than the part of check codes, and the target file is a file to which the target file block belongs, and recovering, by the data processing apparatus, the target file block according to the dependence file block and the dependence check code block. In comparison with the other approaches in which data cannot ensure both low data storage overheads and low network bandwidth overheads in data recovery, in the data recovery method provided in the embodiments of the present disclosure, a check code block is obtained by combining a result of partial byte coding and full byte coding, which reduces storage overheads, in data recovery, a part of a target file block can be obtained by depending on only a part of dependence file blocks, which reduces network bandwidth overheads in data recovery.

BRIEF DESCRIPTION OF DRAWINGS

To describe the technical solutions in the embodiments of the present disclosure more clearly, the following briefly introduces the accompanying drawings required for describing the embodiments.

FIG. 7 is a flowchart diagram of another embodiment of a data storage method according to an embodiment of the present disclosure;

DESCRIPTION OF EMBODIMENTS

Embodiments of the present disclosure provide a data recovery method, which can reduce network bandwidth overheads in data recovery on the premise of low storage overheads. The embodiments of the present disclosure further provide a corresponding data storage method and a corresponding apparatus and system. Details are described in the following separately.

Figure 1:
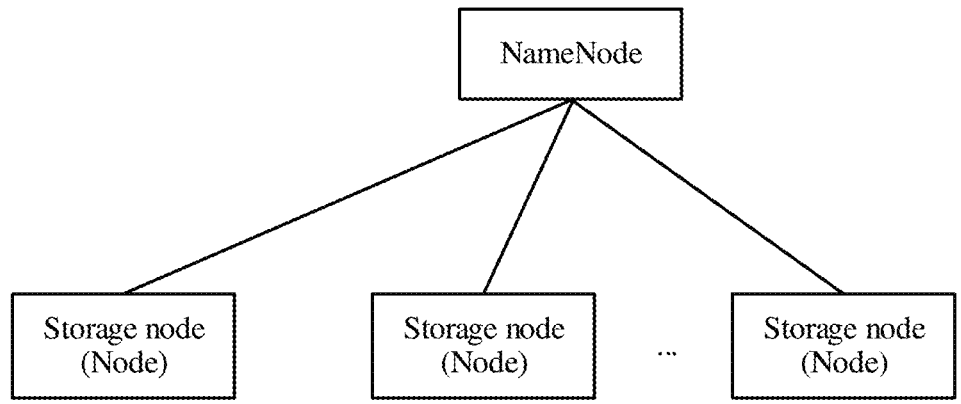
FIG. 1 is a schematic diagram of an embodiment of a distributed storage system according to an embodiment of the present disclosure.

FIG. 1 is a schematic diagram of an embodiment of a distributed storage system according to an embodiment of the present disclosure.

As shown in FIG. 1, the distributed storage system includes a NameNode (NameNode) and multiple storage nodes (Nodes), where each of the storage nodes is communicatively connected to the NameNode. In an embodiment, the NameNode and the storage node may be communicatively connected using a switch.

Figure 2:
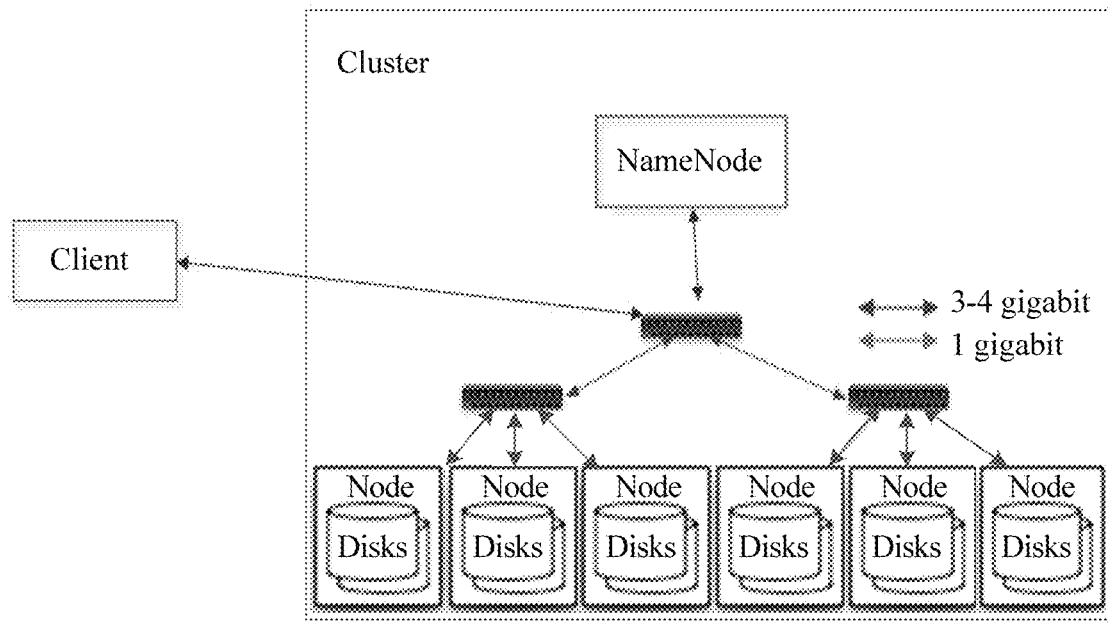
FIG. 2 is a schematic diagram of another embodiment of a distributed storage system according to an embodiment of the present disclosure.

FIG. 2 is a schematic diagram of another embodiment of a distributed storage system according to an embodiment of the present disclosure.

As shown in FIG. 2, multiple storage nodes (designated as nodes) are placed into multiple racks, and storage nodes in a same rack may be communicatively connected using a 1 gigabit (Gbit) switch. As shown in FIG. 2, three storage nodes form one rack, and the three storage nodes are communicatively connected using a switch, racks are communicatively connected using a switch with higher bandwidth, a NameNode manages metadata of an entire cluster, and is directly connected to an upper-layer switch. The NameNode, the storage nodes including disks, the switches, and the racks form a distributed storage cluster. The metadata in this embodiment of the present disclosure refers to a correspondence between each file block of a file and a storage path. One file may be stored on multiple storage nodes in a distributed manner, for example, if a file is stored on five storage nodes, the file has five file blocks, and data content of the file blocks are different. Use of the distributed storage system by user equipment includes two aspects, data storage and data reading. The user equipment accesses the distributed storage system using a network when storing or reading data.

It should be noted that, the storage node provided in this embodiment of the present disclosure may be an independent physical host, or may be a virtual machine located on one or more physical hosts.

In the following, a data storage process and a data recovery process in this embodiment of the present disclosure are separately described from two aspects, data storage and data reading.

It should be noted in advance that, "multiple" in this embodiment of the present disclosure includes two or more.

The data storage process is first described with reference to FIG. 3.

Figure 3:
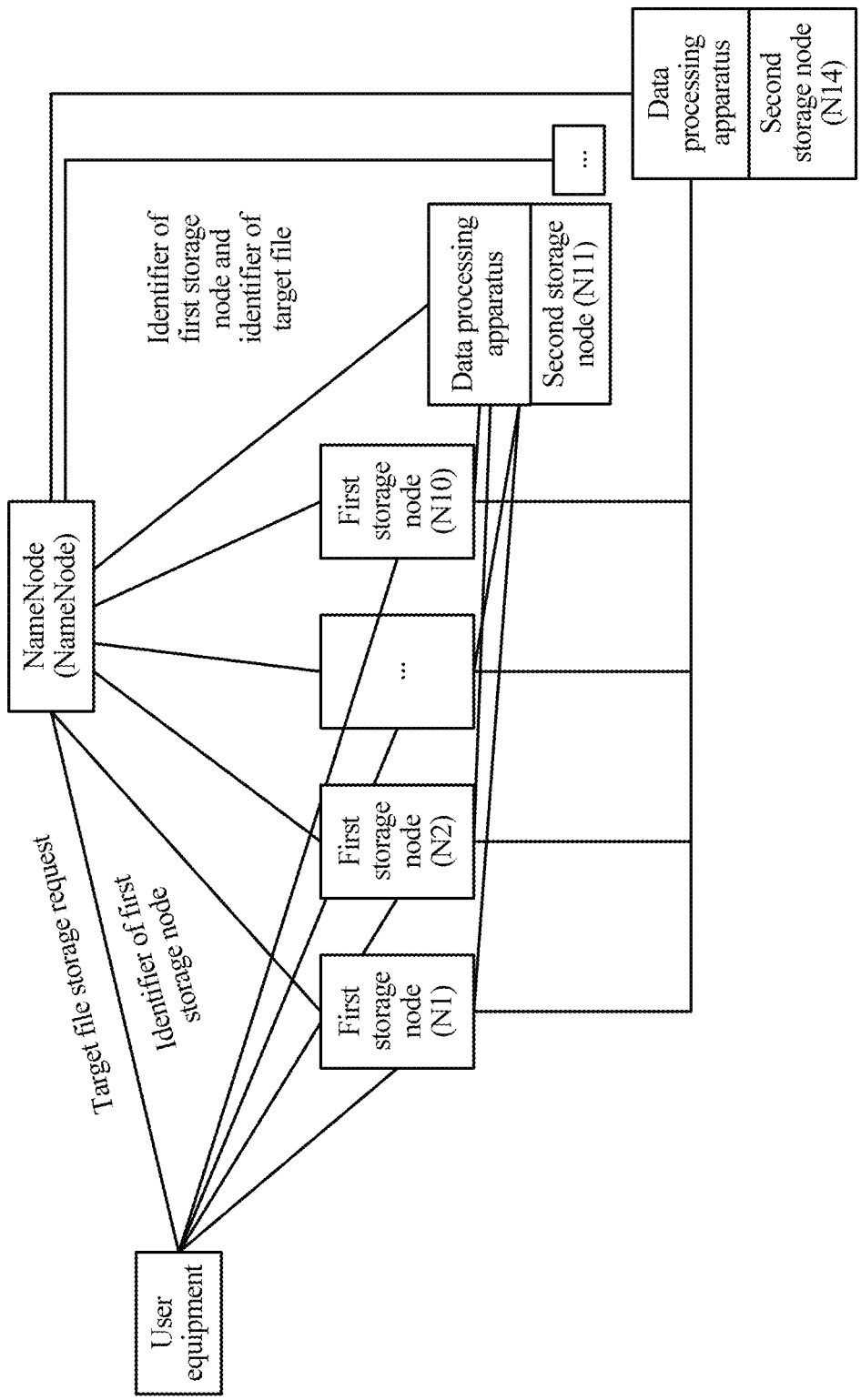
FIG. 3 is a schematic diagram of an embodiment of a data storage method according to an embodiment of the present disclosure.

FIG. 3 is a schematic diagram of an embodiment of a data storage method according to an embodiment of the present disclosure.

A distributed storage system in this embodiment of the present disclosure includes a NameNode, multiple first storage nodes, and multiple second storage nodes, where the multiple first storage nodes store file blocks of a file in a distributed manner, the multiple second storage nodes store, in a distributed manner, check code blocks obtained by coding the file blocks, each of the second storage nodes includes a data processing apparatus, each data processing apparatus is communicatively connected to the NameNode. As shown in FIG. 3, there are ten first storage nodes, and identifiers of the ten first storage nodes are separately N1, N2, . . . , and N10, there are four second storage nodes, and identifiers of the four second storage nodes are separately N11 to N14.

Certainly, FIG. 3 is merely an example. The distributed storage system actually has many first storage nodes and second storage nodes, and each storage node has a corresponding identifier. When user equipment is to store a target file in the distributed storage system, the user equipment first sends a storage request to the NameNode, and the NameNode may allocate a first storage node to the target file according to parameters such as a size of the target file and storage space sizes of the first storage nodes. The NameNode maintains a storage space size of each of the first storage nodes and that of each of the second storage nodes. In addition, after allocating the first storage node to the target file, the NameNode further correspondingly maintains a correspondence between an identifier of the target file and an identifier of each allocated first storage node. For example, after allocating the ten first storage nodes N1 to N10 to the target file, the NameNode maintains correspondences between the identifier of the target file and the ten first storage nodes N1 to N10. The user equipment receives a file storage response sent by the NameNode. If the file storage response carries the identifiers of the ten first storage nodes N1 to N10, the user equipment splits the target file into ten file blocks, and separately stores the ten file blocks on the ten first storage nodes. Certainly, the user equipment may also not split the target file, but stores the target file in turn. Sizes of file blocks on the ten first storage nodes may be the same, or may be different, which is not limited in this embodiment of the present disclosure. After the target file is stored on the ten first storage nodes N1 to N10, to ensure data reliability, the NameNode allocates second storage nodes to the target file to store the ten file blocks of the target file. The NameNode allocates four second storage nodes to the target file, and identifiers of the four second storage nodes are separately N11 to N14, then, the NameNode sends the identifiers of the ten first storage nodes N1 to N10 and the identifier of the target file to data processing apparatuses on N11 to N14. The identifiers of the ten first storage nodes are identifiers of target storage nodes. After receiving the identifiers of N1 to N10 and the identifier of the target file, the data processing apparatuses learn that the ten file blocks of the target file that are on N1 to N10 need to be coded.

In this embodiment of the present disclosure, the data processing apparatus codes the file blocks of the target file using two coding functions, where the first one is a partial byte coding function, and the second one is a full byte coding function. The partial byte coding function is a function that obtains a coding result by coding a part of the file blocks of the target file. The full byte coding function is a function that obtains a coding result by coding all the file blocks of the target file.

The data processing apparatus codes the part of the file blocks of the target file according to the identifiers of the target storage nodes and the partial byte coding function to obtain a first check code.

The data processing apparatus codes all the file blocks of the target file according to the identifiers of the target storage nodes and the full byte coding function to obtain a second check code.

The data processing apparatus stores the first check code and the second check code in storage space of the second storage node to which the data processing apparatus belongs.

In the following, a partial byte coding process and a full byte coding process in this embodiment of the present disclosure are described with reference to instances.

In an application scenario of this embodiment of the present disclosure, ten first storage nodes store the target file, and four second storage nodes used to store check code blocks are allocated to the target file, $a_1, a_2, \ldots$ and $a_{10}$ are respectively the $n^{th}$ bytes in different file blocks of the target file that are on the ten first storage nodes N1, N2, . . . , and N10, $b_1, b_2, \ldots,$ and $b_{10}$ are respectively the $(n+1)^{th}$ bytes in the different file blocks of the target file that are on the ten first storage nodes N1, N2, . . . , and N10, $c_{11}, c_{21}, c_{31},$ and $c_{41}$ are the $n^{th}$ bytes on the second storage nodes N11, N12, N13, and N14, and values of $c_{11}, c_{21}, c_{31},$ and $c_{41}$ are obtained by means of calculation using partial byte coding functions $g_1, g_2, g_3,$ and $g_4$, $c_{12}, c_{22}, c_{32},$ and $c_{42}$ are the $(n+1)^{th}$ bytes on the second storage nodes N11, N12, N13, and N14, and values of $c_{12}, c_{22}, c_{32},$ and $c_{42}$ are obtained by means of calculation using full byte coding functions $f_1, f_2, f_3,$ and $f_4 + g_5$.

For understanding of a coding principle in the foregoing application scenario of the data processing apparatus, reference may be made to Table 1.

TABLE 1

Coding principle of an application scenario instance

| Storage node identifier | the $n^{th}$ byte | the $(n + 1)^{th}$ byte |
|---|---|---|
| N1 | $a_1$ | $b_1$ |
| N2 | $a_2$ | $b_2$ |
| . . . | . . . | . . . |
| N9 | $a_9$ | $b_9$ |
| N10 | $a_{10}$ | $b_{10}$ |
| N11 | $c_{11} = g_1(a_1, a_2, a_3, a_4)$ | $c_{12} = f_1(b_1, b_2, \ldots, b_9, b_{10})$ |
| N12 | $c_{21} = g_2(a_3, a_4, a_5, a_6)$ | $c_{22} = f_2(b_1, b_2, \ldots, b_9, b_{10})$ |
| N13 | $c_{31} = g_3(a_5, a_6, a_7, a_8)$ | $c_{32} = f_3(b_1, b_2, \ldots, b_9, b_{10})$ |
| N14 | $c_{41} = g_4(a_7, a_8, a_9, a_{10})$ | $c_{42} = f_4(b_1, b_2, \ldots, b_9, b_{10}) + g_5(a_9, a_{10}, a_1, a_2)$ | where:

$$g_1(a_1,a_2,a_3,a_4)=B_{11}\times a_1+B_{12}\times a_2+B_{13}\times a_3+B_{14}\times a_4;$$

$$g_2(a_3,a_4,a_5,a_6)=B_{23}\times a_3+B_{24}\times a_4+B_{25}\times a_5+B_{26}\times a_6;$$

$$f_1(b_1,b_2,\ldots,b_9,b_{10})=B_{11}\times b_1+B_{12}\times b_2+\ldots,+B_{19}\times b_9+B_{1,10}\times b_{10};$$

$$f_2(b_1,b_2,\ldots,b_9,b_{10})=B_{21}\times b_1+B_{22}\times b_2+\ldots,+B_{29}\times b_9+B_{2,10}\times b_{10}.$$

Only several function relationship expressions are listed herein, and other function relationship expressions may be obtained by rewriting the foregoing relationship expressions, which are not described one by one herein again.

In addition, principles for coding the $n^{th}$ byte and the $(n+1)^{th}$ byte that are in each file block are described above only for example. Actually, another byte in each file block may also be coded using the two coding functions, which are not listed one by one herein.

In the present disclosure, partial byte coding is used for a group a, and only a part of bytes are used as input parameters of a coding function of the group a, full byte coding is used for a group b, and all bytes are used as input parameters of a coding function of the group b.

A coding matrix used in this embodiment of the present disclosure is:

$$\begin{bmatrix} B_{11} & B_{12} & \wedge & B_{1,10} \\ B_{21} & B_{22} & \wedge & B_{2,10} \\ B_{31} & B_{32} & \wedge & B_{3,10} \\ B_{41} & B_{42} & \wedge & B_{4,10} \end{bmatrix}.$$

A value of the coding matrix is not limited in this embodiment of the present disclosure, provided that an inverse matrix exists. Coefficients needed in the coding functions $g_1$ to $g_5$ and $f_1$ to $f_4$ are obtained from the coding matrix.

It can be seen from the partial byte coding functions in the foregoing example that, two bytes of byte parameters of two closely adjacent partial byte coding functions are overlapped. In this way, each byte can be coded in multiple check codes. Even though multiple file blocks of the target file are lost, it can also be ensured that a lost byte can be normally recovered. The two closely adjacent partial byte coding functions are functions such as $g_1$ and $g_2$, $g_2$ and $g_3$, and $g_3$ and $g_4$ that have a maximum quantity of overlapped parameters.

Certainly, that two bytes are overlapped is merely a case in this example. A specific quantity of byte parameters in a partial byte coding function and a specific quantity of overlapped bytes in two closely adjacent partial byte coding functions may be determined according to a quantity of first storage nodes of the target file and a quantity of second storage nodes of the target file, provided that each byte is coded in at least two check codes.

Figure 4:
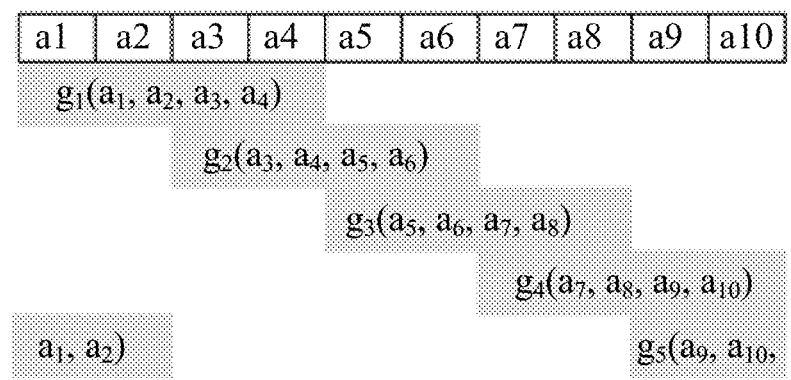
FIG. 4 is a schematic diagram of a scenario example according to an embodiment of the present disclosure.

As shown in FIG. 4, ten bytes $a_1, a_2, \ldots, a_9$, and $a_{10}$ may form five partial byte coding functions according to a case in which two closely adjacent partial byte coding functions have two overlapped bytes.

The five partial byte coding functions are separately $g_1(a_1, a_2, a_3, a_4)$, $g_2(a_3, a_4, a_5, a_6)$, $g_3(a_5, a_6, a_7, a_8)$, $g_4(a_7, a_8, a_9, a_{10})$, and $g_5(a_9, a_{10}, a_1, a_2)$, which ensures that each byte in $a_1, a_2, \ldots, a_9$, and $a_{10}$ is coded in two check codes. In an embodiment, there may also be three overlapped bytes, in this way, each byte in $a_1, a_2, \ldots, a_9$, and $a_{10}$ is coded in three check codes, and reliability is higher, but storage overheads increase.

In the following, an example is used to illustrate a reason why an overlapping length is two bytes when four bytes are selected from the partial byte coding functions in the foregoing example as bytes participating in coding.

It is assumed that nodeNum is a quantity of storage nodes that need to participate in partial byte coding, len is a length of an overlapped part of the nodes, r represents a quantity of second storage nodes, k represents a quantity of first storage nodes, nodeNum and len are determined using the following formulas $r=(k-\text{nodeNum})/(\text{nodeNum}-\text{len})+1$; and bandwidth overheads reduction ratio$=(k-\text{nodeNum})/2k$.

In this embodiment, multiple attempts are made to assign a value. A best parameter combination is that nodeNum=4 and len=2. An increase in a value of nodeNum causes an increase in network bandwidth overheads, and an increase in a value of len causes an increase in storage overheads. Therefore, it is finally determined that nodeNum=4 and len=2, each partial byte coding function may be determined using the two values.

After finishing coding of corresponding bytes in different file blocks of a target file, a data processing apparatus stores a check code in storage space of a second storage node to which the data processing apparatus belongs.

In the foregoing example, data processing apparatuses on N11, N12, N13, and N14 separately perform coding according to respective partial byte coding functions and full byte coding functions, and may concurrently perform coding, thereby improving coding efficiency.

In the following, the data recovery process in this embodiment of the present disclosure is described with reference to FIG. 5.

Figure 5:
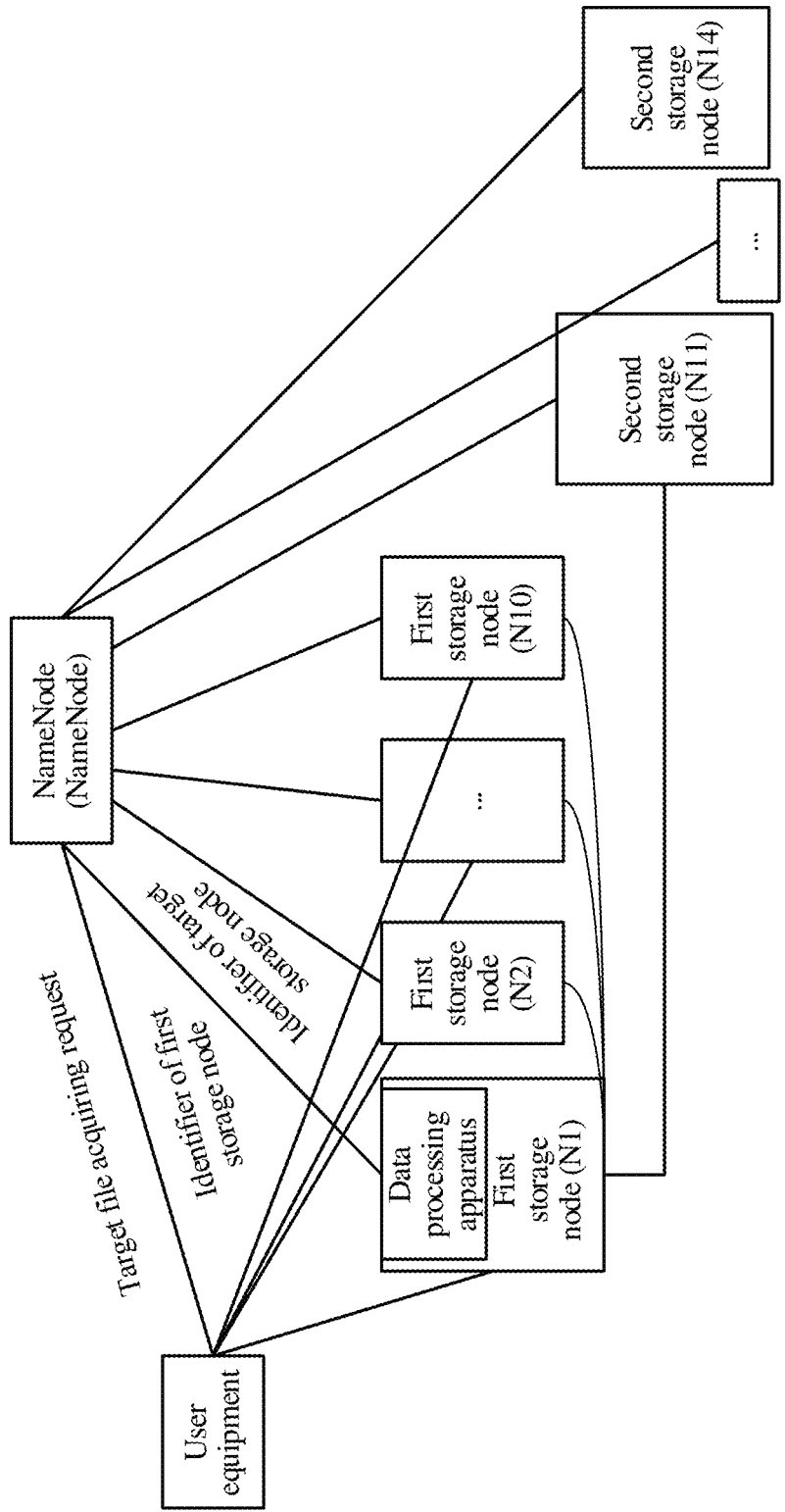
FIG. 5 is a schematic diagram of an embodiment of a data recovery method according to an embodiment of the present disclosure.

A distributed storage system shown in FIG. 5 includes a NameNode, multiple first storage nodes, and multiple second storage nodes, where the multiple first storage nodes store file blocks of a file in a distributed manner, the multiple second storage nodes store, in a distributed manner, check code blocks obtained by coding the file blocks, each of the first storage nodes includes a data processing apparatus (shown only in first storage node (N1)), each data processing apparatus is communicatively connected to the NameNode.

With reference to the scenario shown in FIG. 3, in an example shown in FIG. 5, a target file is stored on ten first storage nodes N1, N2, . . . , and N10, and check codes of the target file are stored on four second storage nodes N11, N12, N13, and N14. Each of the first storage nodes has one data processing apparatus. In an embodiment, the first storage node and the second storage node each have a data processing apparatus, but in a data recovery process, the data processing apparatus on the second storage node does not need to be used temporarily.

When a user is to use the target file, user equipment sends a target file obtaining request to the NameNode, where the target file obtaining request carriers an identifier of the target file. The NameNode determines, according to the identifier of the target file and from an association relationship between identifiers of the first storage nodes and the identifier that is of the target file and is established when the target file is being stored, that the target file is stored on the ten first storage nodes N1, N2, . . . , and N10. The NameNode returns the identifiers of the ten first storage nodes N1, N2, . . . , and N10 to the user equipment.

The user equipment sends a file block obtaining request to the ten first storage nodes N1, N2, . . . , and N10 according to the identifiers of the ten first storage nodes N1, N2, . . . , and N10, where the file block obtaining request carries the identifier of the target file.

If file blocks of the target file that are stored on N1, N2, . . . , and N10 are not lost, the corresponding file blocks are returned to the user equipment. However, in a scenario example of the present disclosure, if the file block on the first storage node N1 is lost, it means that related bytes such as $a_1$ and $b_1$ stored on the first storage node N1 are lost, the lost file block needs to be recovered, and then the recovered file block is returned to the user equipment. In the following, the data recovery process in this embodiment of the present disclosure is described using an example of recovering $a_1$ and $b_1$.

It can be learned from the scenario example corresponding to FIG. 3 that, $a_1$ is coded in a check code according to a partial byte coding function $c_{11}=g_1(a_1, a_2, a_3, a_4)$. Therefore, recovery of $a_1$ needs to depend on four values $a_2, a_3, a_4$, and $c_{11}$, and the four values $a_2, a_3, a_4$, and $c_{11}$ may be respectively obtained from N2, N3, N4, and N11, and then $a_1$ can be obtained by decoding the four values according to an inverse process of coding. Likewise, $b_1$ can be recovered using an inverse process of a function $c_{12}=f_1(b_1, b_2, \ldots, b_9,$ $b_{10}$) after $b_2, \ldots, b_9, b_{10}$, and $c_{12}$ are obtained. Certainly, several other full byte coding functions may further be used to recover $b_1$, but principles are the same.

It can be learned from above that, in the data storage method provided in this embodiment of the present disclosure, a manner of mixing partial byte coding and full byte coding is used, which reduces storage space and improves coding efficiency at the same time of improving byte reliability. In addition, in data recovery, for a byte coded using a partial byte coding function, not all bytes need to be obtained for decoding, which reduces network bandwidth overheads in network data recovery.

Figure 6:
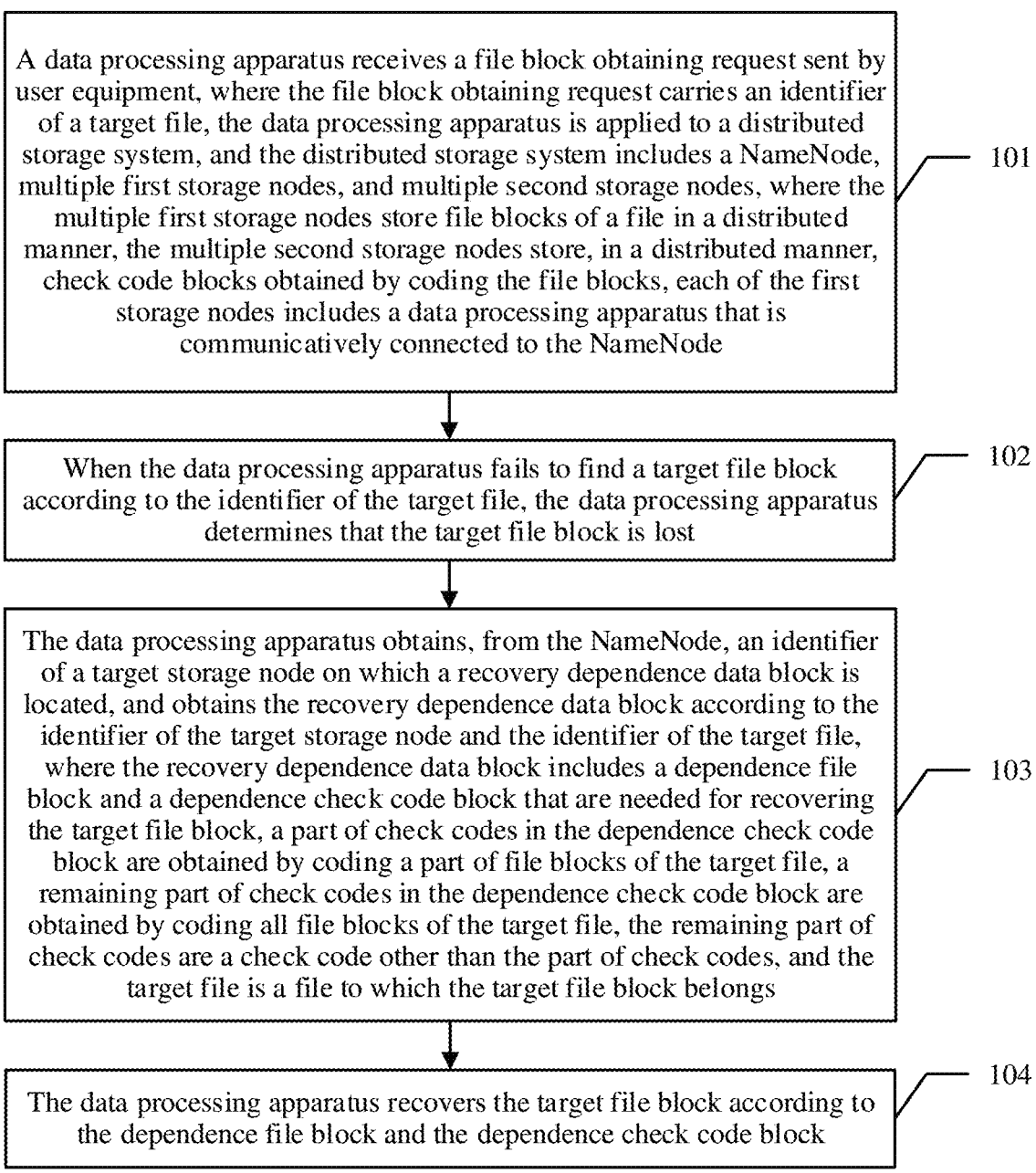
FIG. 6 is a flowchart diagram of another embodiment of a data recovery method according to an embodiment of the present disclosure.

Referring to FIG. 6, an embodiment of a data recovery method provided in an embodiment of the present disclosure includes the following steps.

Step 101: A data processing apparatus receives a file block obtaining request sent by user equipment, where the file block obtaining request carries an identifier of a target file, the data processing apparatus is applied to a distributed storage system, and the distributed storage system includes a NameNode, multiple first storage nodes, and multiple second storage nodes, where the multiple first storage nodes store file blocks of a file in a distributed manner, the multiple second storage nodes store, in a distributed manner, check code blocks obtained by coding the file blocks, each of the first storage nodes includes a data processing apparatus, and each data processing apparatus is communicatively connected to the NameNode.

Step 102: When the data processing apparatus fails to find a target file block according to the identifier of the target file, the data processing apparatus determines that the target file block is lost.

Step 103: The data processing apparatus obtains, from the NameNode, an identifier of a target storage node on which a recovery dependence data block is located, and obtains the recovery dependence data block according to the identifier of the target storage node and the identifier of the target file, where the recovery dependence data block includes a dependence file block and a dependence check code block that are needed for recovering the target file block, a part of check codes in the dependence check code block are obtained by coding a part of file blocks of the target file, a remaining part of check codes in the dependence check code block are obtained by coding all file blocks of the target file, the remaining part of check codes are a check code other than the part of check codes, and the target file is a file to which the target file block belongs.

Step 104: The data processing apparatus recovers the target file block according to the dependence file block and the dependence check code block.

In comparison with the other approaches in which data cannot ensure both low data storage overheads and low network bandwidth overheads in data recovery, in the data recovery method provided in this embodiment of the present disclosure, a check code block is obtained by combining a result of partial byte coding and full byte coding, which reduces storage overheads. In data recovery, a part of a target file block can be obtained by depending on only a part of dependence file blocks, which reduces network bandwidth overheads in data recovery.

Optionally, based on the foregoing embodiment corresponding to FIG. 6, in a first optional embodiment of the data recovery method provided in this embodiment of the present disclosure, that the data processing apparatus recovers the target file block according to the dependence file block and the dependence check code block may include recovering, by the data processing apparatus, a first byte in the target file block according to a partial byte coding function, the dependence file block, and the dependence check code block, where the partial byte coding function is a function that obtains a coding result by coding the part of file blocks of the target file, and recovering, by the data processing apparatus, a second byte in the target file block according to a full byte coding function, the dependence file block, and the dependence check code block, where the full byte coding function is a function that obtains a coding result by coding all the file blocks of the target file.

Optionally, based on the foregoing first optional embodiment corresponding to FIG. 6, in a second optional embodiment of the data recovery method provided in this embodiment of the present disclosure, recovering, by the data processing apparatus, a first byte in the target file block according to a partial byte coding function, the dependence file block, and the dependence check code block may include obtaining, from a dependence file block corresponding to a first coding parameter by the data processing apparatus, a dependence byte needed for recovering the first byte, and obtaining, from a dependence check code block corresponding to a first coding result, a check code needed for recovering the first byte, where the first coding parameter is a coding parameter in the partial byte coding function, and the first coding result is a result obtained by coding, using the partial byte coding function, the first byte and a dependence byte that is indicated by the first coding parameter, and decoding, by the data processing apparatus according to the dependence byte needed for recovering the first byte, the check code needed for recovering the first byte to obtain the first byte.

Optionally, based on the foregoing first or second optional embodiment corresponding to FIG. 6, in a third optional embodiment of the data recovery method provided in this embodiment of the present disclosure, recovering, by the data processing apparatus, a second byte in the target file block according to a full byte coding function, the dependence file block, and the dependence check code block may include obtaining, from a dependence file block corresponding to a second coding parameter by the data processing apparatus, a dependence byte needed for recovering the second byte, and obtaining, from a dependence check code block corresponding to a second coding result, a check code needed for recovering the second byte, where the second coding parameter is a coding parameter in the full byte coding function, and the second coding result is a result obtained by coding, using the full byte coding function, the second byte and a dependence byte that is indicated by the second coding parameter, and decoding, by the data processing apparatus according to the dependence byte needed for recovering the second byte, the check code needed for recovering the second byte to obtain the second byte.

In the embodiment or the optional embodiments corresponding to FIG. 6, the first coding parameter refers to a parameter in the partial byte coding function, for example, $a_1, a_2, a_3$, and $a_4$ in the function $g_1$ in the scenario example in FIG. 3, the second coding parameter refers to a parameter in the full byte coding function, for example, $b_1, b_2, \ldots, b_9$, and $b_{10}$ in the f functions. For understanding of the first byte, reference may be made to the $n^{th}$ byte in the group a, for understanding of the second byte, reference may be made to the $(n+1)^{th}$ byte in the group b. The first byte is generally a byte coded using the partial byte coding function, and the second byte is a byte coded using the full byte coding function. The dependence file block and the dependence check code block are a surviving file block and a surviving check code block that are needed for recovering a lost file block, for example, recovery of a file block that is of a target file and is on the first storage node N1 needs to depend on related file blocks of the target file that are on N2, N3, and N4 and a check code block that is of the target file and is on N11.

For understanding of the embodiment or any optional embodiment corresponding to FIG. 6, reference may be made to related descriptions in FIG. 1 to FIG. 5. Details are not described herein again.

Referring to FIG. 7, an embodiment of a data storage method provided in an embodiment of the present disclosure includes Step 201: A data processing apparatus receives identifiers of multiple target storage nodes and an identifier of a target file that are sent by a NameNode, where the multiple target storage nodes are first storage nodes that have stored file blocks of the target file, the data processing apparatus is applied to a distributed storage system, and the distributed storage system includes the NameNode, multiple first storage nodes, and multiple second storage nodes, where the multiple first storage nodes store file blocks of a file in a distributed manner, the multiple second storage nodes store, in a distributed manner, check code blocks obtained by coding the file blocks, each of the second storage nodes includes a data processing apparatus, and each data processing apparatus is communicatively connected to the NameNode.

Step 202: The data processing apparatus codes a part of file blocks of the target file according to the identifiers of the target storage nodes and a partial byte coding function to obtain a first check code, where the partial byte coding function is a function that obtains a coding result by coding the part of file blocks of the target file.

Step 203: The data processing apparatus codes all file blocks of the target file according to the identifiers of the target storage nodes and a full byte coding function to obtain a second check code, where the full byte coding function is a function that obtains a coding result by coding all the file blocks of the target file.

Step 204: The data processing apparatus stores the first check code and the second check code in storage space of the second storage node to which the data processing apparatus belongs.

In comparison with the other approaches, a manner of mixing partial byte coding and full byte coding is used in the data storage method provided in this embodiment of the present disclosure, which reduces storage space and improves coding efficiency at the same time of improving byte reliability. In addition, in data recovery, for a byte coded using a partial byte coding function, not all bytes need to be obtained for decoding, which reduces network bandwidth overheads in network data recovery.

Optionally, based on the foregoing embodiment corresponding to FIG. 7, in a first optional embodiment of the data storage method provided in this embodiment of the present disclosure, that the data processing apparatus codes a part of file blocks of the target file according to the identifiers of the target storage nodes and a partial byte coding function to obtain a first check code may include obtaining, by the data processing apparatus, a byte indicated by a first coding parameter from a target storage node corresponding to the first coding parameter, where the first coding parameter is each coding parameter in the partial byte coding function, and coding, by the data processing apparatus according to the partial byte coding function, the byte indicated by the first coding parameter, to obtain the first check code.

Optionally, based on the foregoing embodiment or first optional embodiment corresponding to FIG. 7, in a second optional embodiment of the data storage method provided in this embodiment of the present disclosure, that the data processing apparatus codes all file blocks of the target file according to the identifiers of the target storage nodes and a full byte coding function to obtain a second check code may include obtaining, by the data processing apparatus, a byte indicated by a second coding parameter from a target storage node corresponding to the second coding parameter, where the second coding parameter is each coding parameter in the full byte coding function, and coding, by the data processing apparatus according to the full byte coding function, the byte indicated by the second coding parameter to obtain the second check code.

Optionally, based on the foregoing embodiment or the first optional embodiment corresponding to FIG. 7, in a third optional embodiment of the data storage method provided in this embodiment of the present disclosure, before coding, by the data processing apparatus, a part of file blocks of the target file according to the identifiers of the target storage nodes and a partial byte coding function to obtain a first check code, the method may further include determining, by the data processing apparatus according to a quantity of target storage nodes and a quantity of check nodes specified by the NameNode, a quantity of first parameters in the partial byte coding function and a quantity of same first parameters included in partial byte coding functions on two closely adjacent check nodes, where the partial byte coding functions included on the two closely adjacent check nodes have a maximum quantity of overlapped first parameters.

In the embodiment or the optional embodiments corresponding to FIG. 7, the first coding parameter refers to a parameter in the partial byte coding function, for example, $a_1$, $a_2$, $a_3$, and $a_4$ in the function $g_1$ in the scenario example in FIG. 3, the second coding parameter refers to a parameter in the full byte coding function, for example, $b_1$, $b_2$, ..., $b_9$, and $b_{10}$ in the f functions. For understanding of the first check code, reference may be made to $c_{11}$, for understanding of the second check code, reference may be made to $c_{21}$. The first check code is generally a check code obtained by means of coding using the partial byte coding function, and the second check code is obtained by means of coding using the full byte coding function.

For understanding of the embodiment or any optional embodiment corresponding to FIG. 7, reference may be made to related descriptions in FIG. 1 to FIG. 5. Details are not described herein again.

Figure 8:
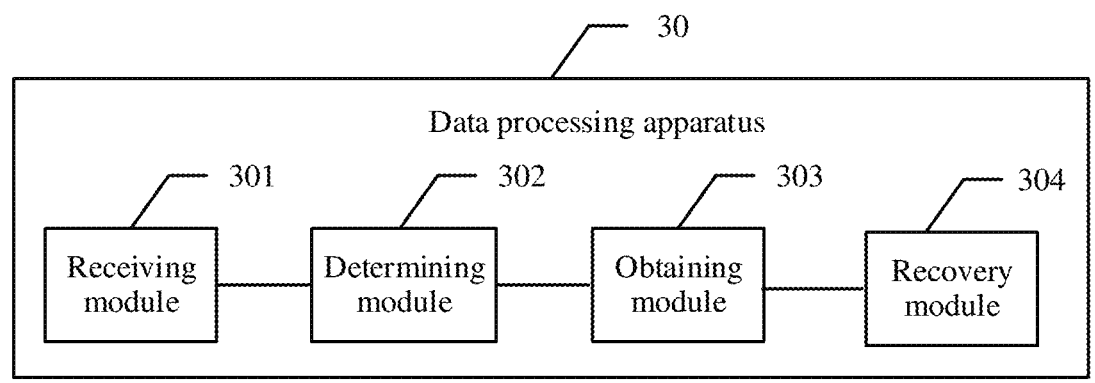
FIG. 8 is a schematic diagram of an embodiment of a data processing apparatus according to an embodiment of the present disclosure.

Referring to FIG. 8, an embodiment of a data processing apparatus 30 provided in an embodiment of the present disclosure is applied to a distributed storage system, where the distributed storage system includes a NameNode, multiple first storage nodes, and multiple second storage nodes. The multiple first storage nodes store file blocks of a file in a distributed manner. The multiple second storage nodes store, in a distributed manner, check code blocks obtained by coding the file blocks. Each of the first storage nodes includes the data processing apparatus, and each data processing apparatus is communicatively connected to the NameNode. The data processing apparatus 30 includes a receiving module 301 configured to receive a file block obtaining request sent by user equipment, where the file block obtaining request carries an identifier of a target file, a determining module 302 configured to determine that a target file block is lost when the determining module 302 fails to find the target file block according to the identifier that is of the target file and that is received by the receiving module 301, an obtaining module 303 configured to obtain, from the NameNode, an identifier of a target storage node on which a recovery dependence data block is located after the determining module 302 determines that the target file block is lost, and obtain the recovery dependence data block according to the identifier of the target storage node and the identifier of the target file, where the recovery dependence data block includes a dependence file block and a dependence check code block that are needed for recovering the target file block, a part of check codes in the dependence check code block are obtained by coding a part of file blocks of the target file, a remaining part of check codes in the dependence check code block are obtained by coding all file blocks of the target file, the remaining part of check codes are a check code other than the part of check codes, and the target file is a file to which the target file block belongs, and a recovery module 304 configured to recover the target file block according to the dependence file block and the dependence check code block that are obtained by the obtaining module 303.

In comparison with the other approaches, in data recovery, for a byte coded using a partial byte coding function, the data processing apparatus 30 provided in this embodiment of the present disclosure does not need to obtain each byte for decoding, which reduces network bandwidth overheads in network data recovery.

Figure 9:
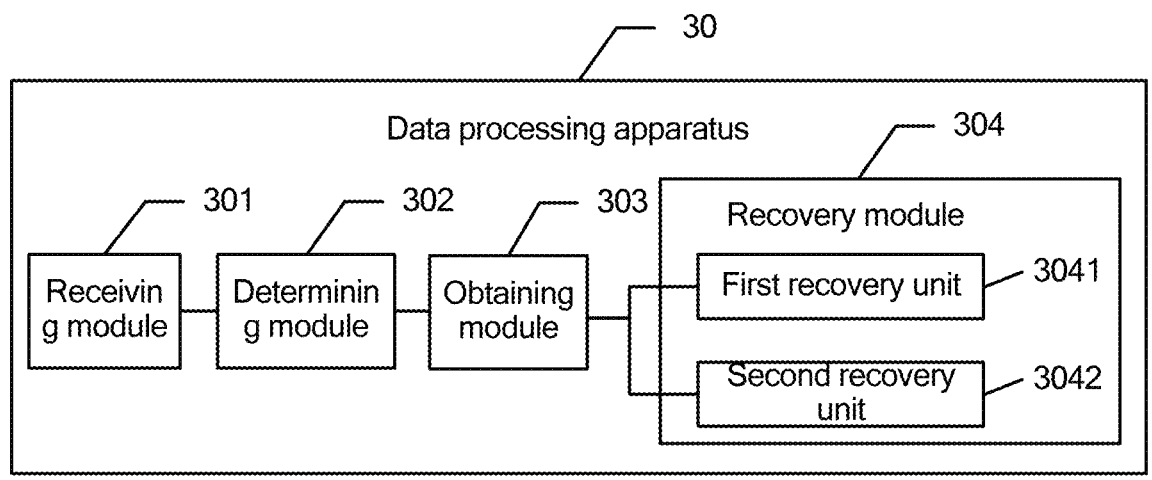
FIG. 9 is a schematic diagram of an embodiment of a data processing apparatus according to an embodiment of the present disclosure.

Optionally, based on the foregoing embodiment corresponding to FIG. 8, referring to FIG. 9, in a first optional embodiment of the data processing apparatus 30 provided in this embodiment of the present disclosure, the recovery module 304 includes a first recovery unit 3041 configured to recover a first byte in the target file block according to a partial byte coding function, the dependence file block, and the dependence check code block, where the partial byte coding function is a function that obtains a coding result by coding the part of file blocks of the target file, and a second recovery unit 3042 configured to recover a second byte in the target file block according to a full byte coding function, the dependence file block, and the dependence check code block, where the full byte coding function is a function that obtains a coding result by coding all the file blocks of the target file.

Optionally, based on the foregoing embodiment corresponding to FIG. 9, in a second optional embodiment of the data processing apparatus 30 provided in this embodiment of the present disclosure, the first recovery unit 3041 is further configured to obtain, from a dependence file block corresponding to a first coding parameter, a dependence byte needed for recovering the first byte, obtain, from a dependence check code block corresponding to a first coding result, a check code needed for recovering the first byte, where the first coding parameter is a coding parameter in the partial byte coding function, and the first coding result is a result obtained by coding, using the partial byte coding function, the first byte and a dependence byte that is indicated by the first coding parameter, and decode, according to the dependence byte needed for recovering the first byte, the check code needed for recovering the first byte, to obtain the first byte.

Optionally, based on the foregoing embodiment corresponding to FIG. 9, in a third optional embodiment of the data processing apparatus 30 provided in this embodiment of the present disclosure, the second recovery unit 3042 is further configured to obtain, from a dependence file block corresponding to a second coding parameter, a dependence byte needed for recovering the second byte, obtain, from a dependence check code block corresponding to a second coding result, a check code needed for recovering the second byte, where the second coding parameter is a coding parameter in the full byte coding function, and the second coding result is a result obtained by coding, using the full byte coding function, the second byte and a dependence byte that is indicated by the second coding parameter, and decode, according to the dependence byte needed for recovering the second byte, the check code needed for recovering the second byte, to obtain the second byte.

In the embodiment or the optional embodiment corresponding to FIG. 8 or FIG. 9, the first coding parameter refers to a parameter in the partial byte coding function, for example, $a_1$, $a_2$, $a_3$, and $a_4$ in the function $g_1$ in the scenario example in FIG. 3. The second coding parameter refers to a parameter in the full byte coding function, for example, $b_1$, $b_2$, ..., $b_9$, and $b_{10}$ in the f functions. For understanding of the first byte, reference may be made to the $n^{th}$ byte in the group a, and for understanding of the second byte, reference may be made to the $(n+1)^{th}$ byte in the group b. The first byte is generally a byte coded using the partial byte coding function, and the second byte is a byte coded using the full byte coding function. The dependence file block and the dependence check code block are a surviving file block and a surviving check code block that are needed for recovering a lost file block, for example, recovery of a file block that is of a target file and is on the first storage node N1 needs to depend on related file blocks of the target file that are on N2, N3, and N4 and a check code block that is of the target file and is on N11.

For understanding of the embodiment or any optional embodiment corresponding to FIG. 8 or FIG. 9, reference may be made to related descriptions in FIG. 1 to FIG. 6. Details are not described herein again.

Figure 10:
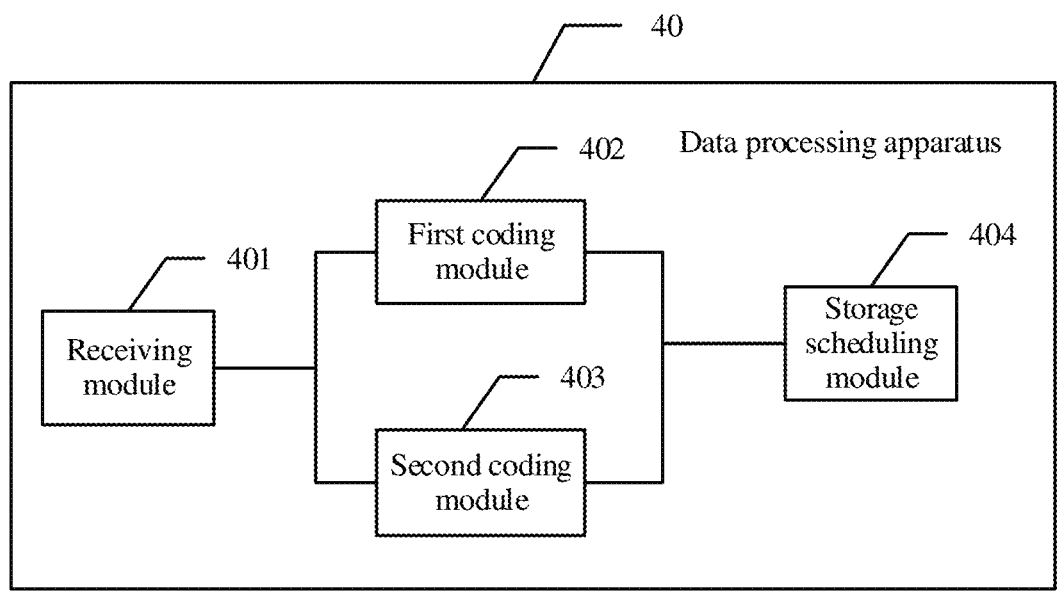
FIG. 10 is a schematic diagram of an embodiment of a data processing apparatus according to an embodiment of the present disclosure.

Referring to FIG. 10, an embodiment of a data processing apparatus 40 provided in an embodiment of the present disclosure is applied to a distributed storage system, where the distributed storage system includes a NameNode, multiple first storage nodes, and multiple second storage nodes. The multiple first storage nodes stores file blocks of a file in a distributed manner. The multiple second storage nodes store, in a distributed manner, check code blocks obtained by coding the file blocks. Each of the second storage nodes includes the data processing apparatus 40, and each data processing apparatus 40 is communicatively connected to the NameNode. The data processing apparatus 40 includes a receiving module 401 configured to receive identifiers of multiple target storage nodes and an identifier of a target file that are sent by the NameNode, where the multiple target storage nodes are the first storage nodes that have stored file blocks of the target file, a first coding module 402 configured to code a part of file blocks of the target file according to a partial byte coding function and the identifiers that are of the target storage nodes and are received by the receiving module 401 to obtain a first check code, where the partial byte coding function is a function that obtains a coding result by coding the part of file blocks of the target file, a second coding module 403 configured to code all file blocks of the target file according to a full byte coding function and the identifiers that are of the target storage nodes and are received by the receiving module 401 to obtain a second check code, where the full byte coding function is a function that obtains a coding result by coding all the file blocks of the target file, and a storage scheduling module 404 configured to store, in storage space of the second storage node to which the data processing apparatus 40 belongs, the first check code obtained by the first coding module 402 by means of coding and the second check code obtained by the second coding module 403 by means of coding.

In comparison with the other approaches, a manner of mixing partial byte coding and full byte coding is used in the data processing apparatus 40 provided in this embodiment of the present disclosure, which reduces storage space and improves coding efficiency at the same time of improving byte reliability. In addition, in data recovery, for a byte coded using a partial byte coding function, not all bytes need to be obtained for decoding, which reduces network bandwidth overheads in network data recovery.

Optionally, based on the foregoing embodiment corresponding to FIG. 10, in a first optional embodiment of the data processing apparatus 40 provided in this embodiment of the present disclosure, the first coding module 402 is further configured to obtain a byte indicated by a first coding parameter from a target storage node corresponding to the first coding parameter, where the first coding parameter is each coding parameter in the partial byte coding function, and code, according to the partial byte coding function, the byte indicated by the first coding parameter to obtain the first check code.

Optionally, based on the foregoing embodiment or the first optional embodiment corresponding to FIG. 10, in a second optional embodiment of the data processing apparatus 40 provided in this embodiment of the present disclosure, the second coding module 403 is further configured to obtain a byte indicated by a second coding parameter from a target storage node corresponding to the second coding parameter, where the second coding parameter is each coding parameter in the full byte coding function, and code, according to the full byte coding function, the byte indicated by the second coding parameter to obtain the second check code.

Figure 11:
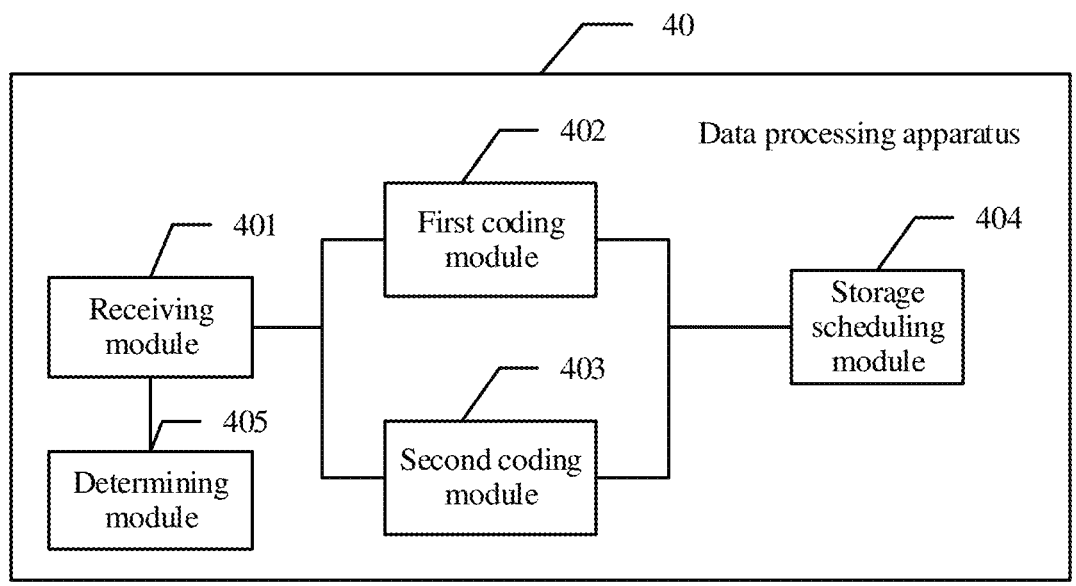
FIG. 11 is a schematic diagram of an embodiment of a data processing apparatus according to an embodiment of the present disclosure.

Optionally, based on the foregoing embodiment or the first optional embodiment corresponding to FIG. 10, referring to FIG. 11, in a third optional embodiment of the data processing apparatus 40 provided in this embodiment of the present disclosure, the data processing apparatus 40 further includes a determining module 405 configured to determine, according to a quantity of target storage nodes and a quantity of check nodes specified by the NameNode, a quantity of first parameters in the partial byte coding function and a quantity of same first parameters included in partial byte coding functions on two closely adjacent check nodes, where the partial byte coding functions included on the two closely adjacent check nodes have a maximum quantity of overlapped first parameters.

In the embodiment or the optional embodiment corresponding to FIG. 10 and FIG. 11, the first coding parameter refers to a parameter in the partial byte coding function, for example, $a_1$, $a_2$, $a_3$, and $a_4$ in the function $g_1$ in the scenario example in FIG. 3, the second coding parameter refers to a parameter in the full byte coding function, for example, $b_1$, $b_2$, . . . , $b_9$, and $b_{10}$ in the f functions. For understanding of the first check code, reference may be made to $c_{11}$, for understanding of the second check code, reference may be made to $c_{21}$. The first check code is generally a check code obtained by means of coding using the partial byte coding function, and the second check code is obtained by means of coding using the full byte coding function.

For understanding of the embodiment or any optional embodiment corresponding to FIG. 10 and FIG. 11, reference may be made to related descriptions in FIG. 1 to FIG. 5 and FIG. 7. Details are not described herein again.

In multiple embodiments of the foregoing data processing apparatuses 30 and 40, it should be understood that, in an implementation manner, the receiving module 301 and 401 and the obtaining module 303 may be implemented using an input/output (I/O) device (such as a network interface card), and the determining module 302 and 405, the recovery module 304, the first coding module 402, the second coding module 403, and the storage scheduling module 404 may be implemented by performing a program or an instruction in a memory by a processor (in other words, implemented using the processor and mutual cooperation of special instructions in the memory coupled to the processor). In another implementation manner, the receiving module 301 and 401 and the obtaining module 303 may be implemented using an I/O device (such as a network interface card), and the determining module 302 and 405, the recovery module 304, the first coding module 402, the second coding module 403, and the storage scheduling module 404 may also be separately implemented using a dedicated circuit, and for a specific implementation manner, reference may be made to the other approaches, and details are not described herein again. In still another implementation manner, the receiving module 301 and 401 and the obtaining module 303 may be implemented using an I/O device (such as a network interface card), and the determining module 302 and 405, the recovery module 304, the first coding module 402, the second coding module 403, and the storage scheduling module 404 may also be implemented using a field programmable gate array (FPGA), for a specific implementation manner, reference may be made to the other approaches, and details are not described herein again. The present disclosure includes but is not limited to the foregoing implementation manners, and it should be understood that, all solutions implemented according to an idea of the present disclosure fall within the protection scope of this embodiment of the present disclosure.

Figure 12:
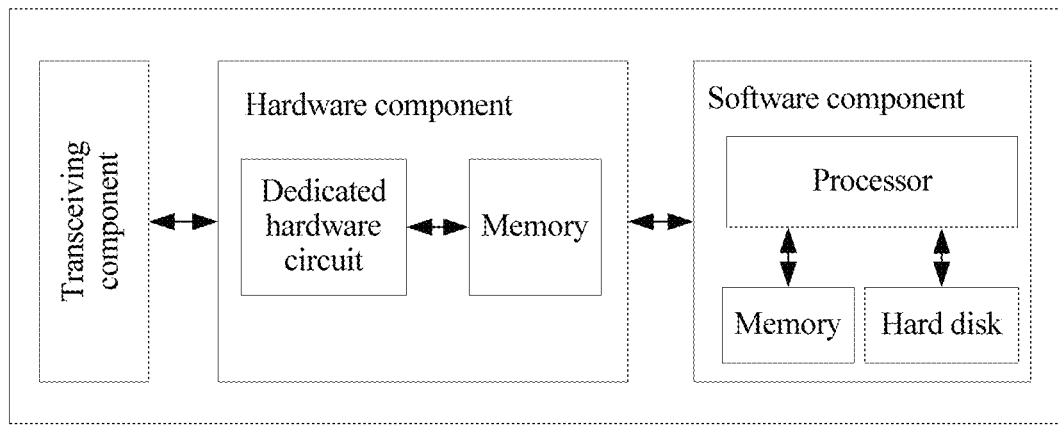
FIG. 12 is a schematic diagram of an embodiment of a data processing apparatus according to an embodiment of the present disclosure.

An embodiment provides a hardware structure of a data processing apparatus. As shown in FIG. 12, a hardware structure of a data processing apparatus may include three parts, a transceiving component, a software component, and a hardware component.

The transceiving component is a hardware circuit used to complete packet receiving and transmission.

The hardware component may also be referred to as a "hardware processing module," or more simply, may be referred to as "hardware" for short. The hardware component mainly includes a hardware circuit that implements some specific functions based on dedicated hardware circuits (which may also cooperate with another auxiliary component, such as a memory) such as an FPGA and an application-specific integrated circuit (ASIC), where a processing speed of the hardware component is generally much faster than that of a general purpose processor. However, once a function is customized, it is difficult to change the function. Therefore, the hardware component is not flexible in implementation, and is generally used to process some fixed functions. It should be noted that in actual application, the hardware component may also include a processor such as a microprocessor, such as a single-chip microcomputer, microcontroller unit (MCU) or a central processing unit (CPU). However, main functions of these processors are not to complete large data processing, but mainly to perform some control. In such an application scenario, a system including these components is a hardware component.

The software component (or referred to as "software" for short) mainly includes a general purpose processor (for example, a CPU) and some auxiliary components (for example, storage devices such as a memory and a hard disk) of the general purpose processor, and may enable, by means of programming, a processor to have a corresponding processing function. When the software component is used to implement the corresponding processing function, the software component may be flexibly configured according to a service, but a speed of the software device is generally slower than that of the hardware component. After the software component completes processing, processed data may be sent by the hardware component using the transceiving component, or the processed data may be sent to the transceiving component using an interface connected to the transceiving component.

In this embodiment, the transceiving component is configured to receive an identifier of a target file, an identifier of a target storage node, and the like.

Other functions of the hardware component and the software component have been described in detail in the foregoing embodiments, and details are not described herein again.

The following describes in detail, with reference to the accompanying drawings, a technical solution in which the receiving module 301 and 401 and the obtaining module 303 may be implemented using an I/O device (such as a network interface card), and the determining module 302 and 405, the recovery module 304, the first coding module 402, the second coding module 403, and the storage scheduling module 404 may be implemented by performing a program or an instruction in a memory by a processor.

Figure 13:
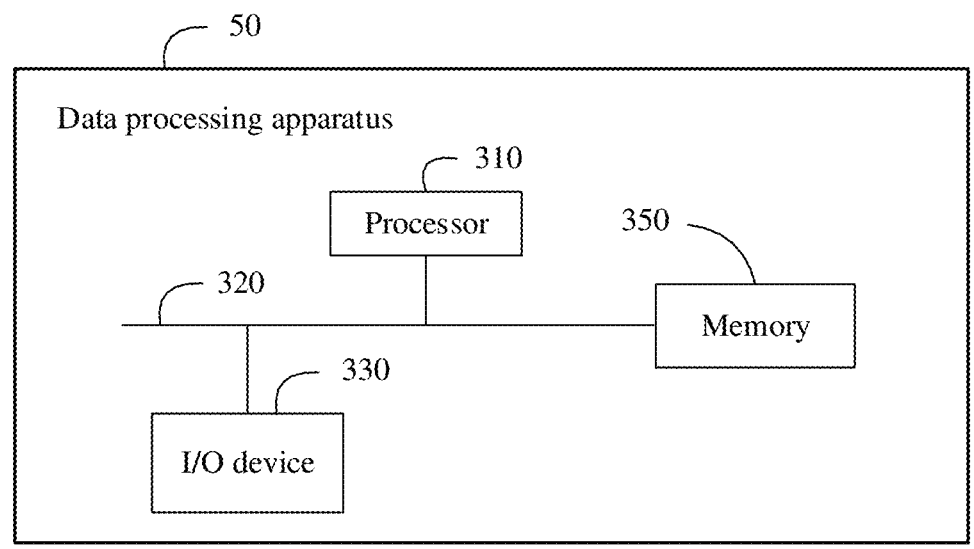
FIG. 13 is a schematic diagram of an embodiment of a data processing apparatus according to an embodiment of the present disclosure.

FIG. 13 is a schematic structural diagram of a data processing apparatus 50 according to an embodiment of the present disclosure. The data processing apparatus 50 is applied to a distributed storage system, where the distributed storage system includes a NameNode, multiple first storage nodes, and multiple second storage nodes. The multiple first storage nodes store file blocks of a file in a distributed manner. The multiple second storage nodes store, in a distributed manner, check code blocks obtained by coding the file blocks. Each of the first storage nodes includes the data processing apparatus 50, and each data processing apparatus 50 is communicatively connected to the NameNode. The data processing apparatus 50 includes a processor 310, a memory 350, and an I/O device 330, where the memory 350 may include a read-only memory (ROM) and a random access memory (RAM), and provide an operation instruction and data to the processor 310. A part of the memory 350 may further include a non-volatile RAM (NVRAM).

In some implementation manners, the memory 350 stores the elements an executable module or a data structure, a subset thereof, or an extended set thereof. When the data processing apparatus 50 is a source device, in this embodiment of the present disclosure, the data processing apparatus 50 invokes an operation instruction (the operation instruction may be stored in an operating system) stored in the memory 350 to receive, using the I/O device 330, a file block obtaining request sent by user equipment, where the file block obtaining request carries an identifier of a target file, obtain, from the NameNode using the I/O device 330, an identifier of a target storage node on which a recovery dependence data block is located, and obtain the recovery dependence data block according to the identifier of the target storage node and the identifier of the target file, where the recovery dependence data block includes a dependence file block and a dependence check code block that are needed for recovering a target file block, a part of check codes in the dependence check code block are obtained by coding a part of file blocks of the target file, a remaining part of check codes in the dependence check code block are obtained by coding all file blocks of the target file, the remaining part of check codes are a check code other than the part of check codes, and the target file is a file to which the target file block belongs, and recover the target file block according to the dependence file block and the dependence check code block.

In comparison with the other approaches in which data cannot ensure both low data storage overheads and low network bandwidth overheads in data recovery, in the data processing apparatus 50 provided in this embodiment of the present disclosure, a check code block is obtained by combining a result of partial byte coding and full byte coding, which reduces storage overheads, in data recovery, a part of a target file block can be obtained by depending on only a part of dependence file blocks, which reduces network bandwidth overheads in data recovery.

The processor 310 controls an operation of the data processing apparatus 50, and the processor 310 may also be referred to as a CPU. The memory 350 may include a ROM and a RAM, and provides an instruction and data to the processor 310. A part of the memory 350 may further include an NVRAM. In specific application, all components of the data processing apparatus 50 are coupled together using a bus system 320, where the bus system 320 may further include a power supply bus, a control bus, a status signal bus, and the like in addition to a data bus. However, for clear description, various types of buses in FIG. 13 are marked as the bus system 320.

The methods disclosed in the foregoing embodiments of the present disclosure may be applied to the processor 310, or may be implemented by the processor 310. The processor 310 may be an integrated circuit chip and has a signal processing capability. In an implementation process, the steps in the foregoing methods may be completed using an integrated logic circuit of hardware in the processor 310 or an instruction in a form of software. The foregoing processor 310 may be a general purpose processor, a digital signal processor (DSP), an ASIC, an FPGA, or another programmable logic device, discrete gate or transistor logic device, or discrete hardware device. The processor 310 may implement or execute methods, steps and logical block diagrams disclosed in the embodiments of the present disclosure. The general purpose processor may be a microprocessor or the processor 310 may be any conventional processor and the like. Steps of the methods disclosed with reference to the embodiments of the present disclosure may be directly executed and completed by means of a hardware decoding processor, or may be executed and completed using a combination of hardware and software modules in a decoding processor. The software module may be located in a mature storage medium in the field, such as a RAM, a flash memory, a ROM, a programmable ROM (PROM), an electrically-erasable PROM (EEPROM), or a register. The storage medium is located in the memory 350, and the processor 310 reads information in the memory 350 and completes the steps in the foregoing methods in combination with hardware of the processor 310.

Optionally, the processor 310 is further configured to recover a first byte in the target file block according to a partial byte coding function, the dependence file block, and the dependence check code block, where the partial byte coding function is a function that obtains a coding result by coding the part of file blocks of the target file, and recover a second byte in the target file block according to a full byte coding function, the dependence file block, and the dependence check code block, where the full byte coding function is a function that obtains a coding result by coding all the file blocks of the target file.

Optionally, the processor 310 is further configured to obtain, from a dependence file block corresponding to a first coding parameter, a dependence byte needed for recovering the first byte, and obtain, from a dependence check code block corresponding to a first coding result, a check code needed for recovering the first byte, where the first coding parameter is a coding parameter in the partial byte coding function, and the first coding result is a result obtained by coding, using the partial byte coding function, the first byte and a dependence byte that is indicated by the first coding parameter, and decode, according to the dependence byte needed for recovering the first byte, the check code needed for recovering the first byte to obtain the first byte.

Optionally, the processor 310 is further configured to obtain, from a dependence file block corresponding to a second coding parameter, a dependence byte needed for recovering the second byte, and obtain, from a dependence check code block corresponding to a second coding result, a check code needed for recovering the second byte, where the second coding parameter is a coding parameter in the full byte coding function, and the second coding result is a result obtained by coding, using the full byte coding function, the second byte and a dependence byte that is indicated by the second coding parameter, and decode, according to the dependence byte needed for recovering the second byte, the check code needed for recovering the second byte to obtain the second byte.

In the embodiment corresponding to FIG. 13, the first coding parameter refers to a parameter in the partial byte coding function, for example, $a_1$, $a_2$, $a_3$, and $a_4$ in the function $g_1$ in the scenario example in FIG. 3, the second coding parameter refers to a parameter in the full byte coding function, for example, $b_1$, $b_2$, . . . , $b_9$, and $b_{10}$ in the f functions. For understanding of the first byte, reference may be made to the $n^{th}$ byte in the group a, for understanding of the second byte, reference may be made to the $(n+1)^{th}$ byte in the group b. The first byte is generally a byte coded using the partial byte coding function, the second byte is a byte coded using the full byte coding function. The dependence file block and the dependence check code block are a surviving file block and a surviving check code block that are needed for recovering a lost file block, for example, recovery of a file block that is of a target file and is on the first storage node N1 needs to depend on related file blocks of the target file that are on N2, N3, and N4 and a check code block that is of the target file and is on N11.

For understanding of the embodiment corresponding to FIG. 13, reference may be made to related descriptions in FIG. 1 to FIG. 5, FIG. 6, FIG. 8, and FIG. 9. Details are not described herein again.

Figure 14:
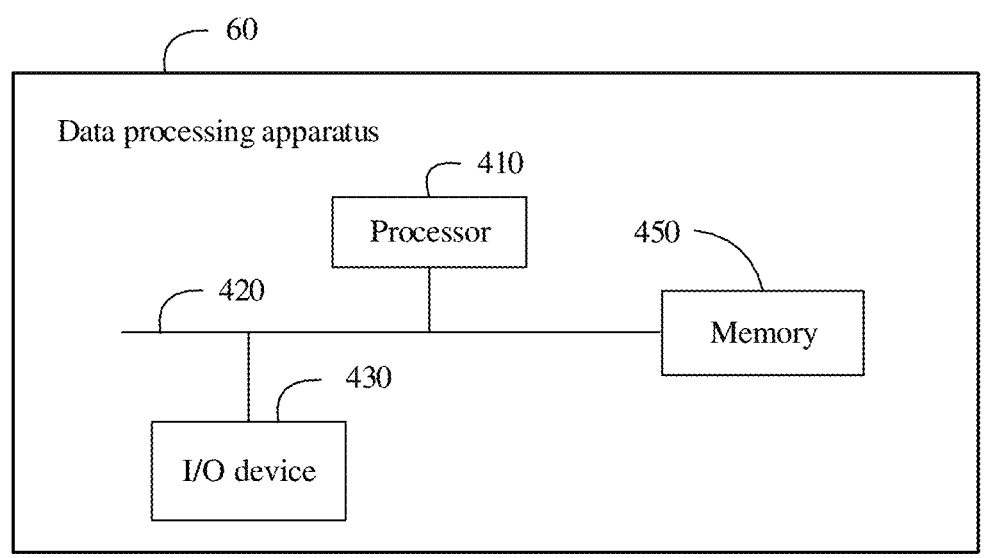
FIG. 14 is a schematic diagram of an embodiment of a data processing apparatus according to an embodiment of the present disclosure.

FIG. 14 is a schematic structural diagram of a data processing apparatus 60 according to an embodiment of the present disclosure. The data processing apparatus 60 is applied to a distributed storage system, where the distributed storage system includes a NameNode, multiple first storage nodes, and multiple second storage nodes. The multiple first storage nodes store file blocks of a file in a distributed manner. The multiple second storage nodes store, in a distributed manner, check code blocks obtained by coding the file blocks. Each of the second storage nodes includes the data processing apparatus 60, and each data processing apparatus 60 is communicatively connected to the NameNode. The data processing apparatus 60 includes a processor 410, a memory 450, and an I/O device 430. The memory 450 may include a ROM and a RAM, and provides an operation instruction and data to the processor 410. A part of the memory 450 may further include an NVRAM.

In some implementation manners, the memory 450 stores an executable module or a data structure, a subset thereof, or an extended set thereof.

When the data processing apparatus 60 is a source device, in this embodiment of the present disclosure, the data processing apparatus 60 invokes an operation instruction (the operation instruction may be stored in an operating system) stored in the memory 450 to receive, using the I/O device 430, identifiers of multiple target storage nodes and an identifier of a target file that are sent by the NameNode, where the multiple target storage nodes are the first storage nodes that have stored file blocks of the target file, code a part of file blocks of the target file according to the identifiers of the target storage nodes and a partial byte coding function to obtain a first check code, where the partial byte coding function is a function that obtains a coding result by coding the part of file blocks of the target file, code all file blocks of the target file according to the identifiers of the target storage nodes and a full byte coding function to obtain a second check code, where the full byte coding function is a function that obtains a coding result by coding all the file blocks of the target file, and store the first check code and the second check code in storage space of the second storage node to which the data processing apparatus belongs.

In comparison with the other approaches, a manner of mixing partial byte coding and full byte coding is used in the data processing apparatus provided in this embodiment of the present disclosure, which reduces storage space and improves coding efficiency at the same time of improving byte reliability. In addition, in data recovery, for a byte coded using a partial byte coding function, not all bytes need to be obtained for decoding, which reduces network bandwidth overheads in network data recovery.

The processor 410 controls an operation of the data processing apparatus 60, and the processor 410 may also be referred to as a CPU. The memory 450 may include a ROM and a RAM, and provides an instruction and data to the processor 410. A part of the memory 450 may further include an NVRAM. In specific application, all components of the data processing apparatus 60 are coupled together using a bus system 420, where the bus system 420 may further include a power supply bus, a control bus, a status signal bus, and the like in addition to a data bus. However, for clear description, various types of buses in the figure are marked as the bus system 420.

The methods disclosed in the foregoing embodiments of the present disclosure may be applied to the processor 410, or may be implemented by the processor 410. The processor 410 may be an integrated circuit chip and has a signal processing capability. In an implementation process, the steps in the foregoing methods may be completed using an integrated logic circuit of hardware in the processor 410 or an instruction in a form of software. The foregoing processor 410 may be a general purpose processor, a DSP, an ASIC, an FPGA, or another programmable logic device, discrete gate or transistor logic device, or discrete hardware device. The processor 410 may implement or execute methods, steps and logical block diagrams disclosed in the embodiments of the present disclosure. The general purpose processor may be a microprocessor or the processor 410 may be any conventional processor and the like. Steps of the methods disclosed with reference to the embodiments of the present disclosure may be directly executed and completed by means of a hardware decoding processor, or may be executed and completed using a combination of hardware and software modules in a decoding processor. The software module may be located in a mature storage medium in the field, such as a RAM, a flash memory, a ROM, a PROM, an EEPROM, or a register. The storage medium is located in the memory 450, and the processor 410 reads information in the memory 450 and completes the steps in the foregoing methods in combination with hardware of the processor 410.

Optionally, the processor 410 is further configured to obtain a byte indicated by a first coding parameter from a target storage node corresponding to the first coding parameter, where the first coding parameter is each coding parameter in the partial byte coding function, and code, according to the partial byte coding function, the byte indicated by the first coding parameter to obtain the first check code.

Optionally, the processor 410 is further configured to obtain a byte indicated by a second coding parameter from a target storage node corresponding to the second coding parameter, where the second coding parameter is each coding parameter in the full byte coding function, and code, according to the full byte coding function, the byte indicated by the second coding parameter to obtain the second check code.

Optionally, the processor 410 is further configured to determine, according to a quantity of target storage nodes and a quantity of check nodes specified by the NameNode, a quantity of first parameters in the partial byte coding function and a quantity of same first parameters included in partial byte coding functions on two closely adjacent check nodes, where the partial byte coding functions included on the two closely adjacent check nodes have a maximum quantity of overlapped first parameters.

In the embodiment corresponding to FIG. 14, the first coding parameter refers to a parameter in the partial byte coding function, for example, $a_1$, $a_2$, $a_3$, and $a_4$ in the function $g_1$ in the scenario example in FIG. 3, the second coding parameter refers to a parameter in the full byte coding function, for example, $b_1$, $b_2$, . . . , $b_9$, and $b_{10}$ in the f functions. For understanding of the first check code, reference may be made to $c_{11}$, for understanding of the second check code, reference may be made to $c_{21}$. The first check code is generally a check code obtained by means of coding using the partial byte coding function, and the second check code is obtained by means of coding using the full byte coding function.

For understanding of the embodiment corresponding to FIG. 14, reference may be made to related descriptions in FIG. 1 to FIG. 5, FIG. 7, FIG. 10, and FIG. 11. Details are not described herein again.

A distributed storage system provided in an embodiment of the present disclosure includes a NameNode, multiple first storage nodes, and multiple second storage nodes, where the multiple first storage nodes store file blocks of a file in a distributed manner, the multiple second storage nodes store, in a distributed manner, check code blocks obtained by coding the file blocks, each of the first storage nodes includes a first data processing apparatus, each of the second storage nodes includes a second data processing apparatus, and each first data processing apparatus and each second data processing apparatus are communicatively connected to the NameNode.

For understanding of the first data processing apparatus, reference may be made to descriptions in FIG. 3, for understanding of the second data processing apparatus, reference may be made to descriptions in FIG. 5. Details are not described herein again.

In comparison with the other approaches in which data cannot ensure both low data storage overheads and low network bandwidth overheads in data recovery, in the distributed storage system provided in this embodiment of the present disclosure, a check code block is obtained by combining a result of partial byte coding and full byte coding, which reduces storage overheads. In data recovery, a part of a target file block can be obtained by depending on only a part of dependence file blocks, which reduces network bandwidth overheads in data recovery.

A person of ordinary skill in the art may understand that all or some of the steps of the methods in the embodiments may be implemented by a program instructing relevant hardware. The program may be stored in a computer-readable storage medium. The storage medium may include a ROM, a RAM, a magnetic disk, or an optical disc.

The foregoing gives detailed descriptions on the data storage method, the data recovery method, and the related apparatus and system provided in embodiments of the present disclosure. In this specification, specific examples are used to describe the principle and implementation manners of the present disclosure, and the description of the embodiments is only intended to help understand the method and core idea of the present disclosure. In addition, a person of ordinary skill in the art may, based on the idea of the present disclosure, make modifications with respect to the specific implementation manners and the application scope. Therefore, the content of this specification shall not be construed as a limitation to the present disclosure.

What is claimed is:

1. A data storage method applied to a distributed storage system comprising a NameNode, a plurality of first storage nodes, and a plurality of second storage nodes, wherein each of the second storage nodes comprises a data processing apparatus communicatively coupled to the NameNode, wherein the method comprises:

receiving, by the data processing apparatus from the NameNode, identifiers of a plurality of target storage nodes and an identifier of a target file, wherein the plurality of target storage nodes comprise stored file blocks of the target file, wherein the plurality of first storage nodes are configured to store file blocks in a distributed manner, and wherein the plurality of second storage nodes are configured to store check code blocks obtained by coding the file blocks in the distributed manner;

coding, by the data processing apparatus, a portion of the file blocks of the target file according to the identifiers and a partial byte coding function to obtain a first check code;

coding, by the data processing apparatus, all of the file blocks of the target file according to the identifiers and a full byte coding function to obtain a second check code; and storing, by the data processing apparatus, the first check code and the second check code in storage space of one of the plurality of second storage nodes comprising the data processing apparatus.

2. The method of claim 1, wherein coding the portion of the file blocks comprises:

obtaining a byte indicated by a first coding parameter of the partial byte coding function from one of the plurality of target storage nodes corresponding to the first coding parameter; and coding, according to the partial byte coding function, the byte indicated by the first coding parameter to obtain the first check code.

3. The method of claim 1, wherein coding all the file blocks comprises:
obtaining a byte indicated by a second coding parameter of the full byte coding function from one of the plurality of target storage nodes corresponding to the second coding parameter; and
coding, according to the full byte coding function, the byte indicated by the second coding parameter to obtain the second check code.

4. The method of claim 1, wherein before coding the portion of the file blocks, the method further comprises determining, by the data processing apparatus according to a quantity of target storage nodes and a quantity of check nodes specified by the NameNode, a quantity of first parameters in the partial byte coding function and a quantity of same first parameters comprised in partial byte coding functions on two proximately adjacent check nodes, and wherein the partial byte coding functions comprised on the two proximately adjacent check nodes have a maximum quantity of overlapped first parameters.

5. A data processing apparatus that is part of a distributed storage system comprising a NameNode, a plurality of first storage nodes configured to store file blocks of a file in a distributed manner, and a plurality of second storage nodes configured to store check code blocks obtained by coding the file blocks in the distributed manner, wherein the data processing apparatus comprises:
an input/output (I/O) device configured to receive a file block obtaining request from a user equipment, wherein the file block obtaining request carries an identifier of a target file, and wherein each of the first storage nodes comprises an instance of the data processing apparatus communicatively coupled to the NameNode;
a memory coupled to the I/O device and configured to store instructions; and
a processor coupled to the memory and the I/O device, wherein when executed, the instructions cause the processor to:
determine that a target file block is lost when failing to find the target file block according to the identifier of the target file;
obtain, from the NameNode, an identifier of a target storage node on which a recovery dependence data block is located;
obtain the recovery dependence data block according to the identifier of the target storage node and the identifier of the target file, wherein the recovery dependence data block comprises a dependence file block and a dependence check code block wherein a first portion of check codes in the dependence check code block are obtained by coding a first portion of file blocks of the target file, wherein a remaining portion of the check codes in the dependence check code block other than the first portion of the check codes are obtained by coding all the file blocks of the target file, and wherein the target file block belongs to the target file; and
recover the target file block according to the dependence file block and the dependence check code block.

6. The data processing apparatus of claim 5, wherein the instructions further cause the processor to:
recover a first byte in the target file block according to a partial byte coding function, the dependence file block, and the dependence check code block, wherein the partial byte coding function obtains a coding result by coding first portion of the file blocks of the target file; and
recover a second byte in the target file block according to a full byte coding function, the dependence file block, and the dependence check code block, wherein the full byte coding function obtains another coding result by coding all the file blocks of the target file.

7. The data processing apparatus of claim 6, wherein the instructions further cause the processor to:
obtain, from a dependence file block corresponding to a first coding parameter of the partial byte coding function, a dependence byte needed for recovering the first byte;
obtain, from a dependence check code block corresponding to a first coding result, a check code needed for recovering the first byte, wherein the first coding result is obtained by coding, using the partial byte coding function, the first byte and a dependence byte indicated by the first coding parameter; and
decode, according to the dependence byte needed for recovering the first byte, the check code needed for recovering the first byte to obtain the first byte.

8. The data processing apparatus of claim 6, wherein the instructions further cause the processor to:
obtain, from a dependence file block corresponding to a second coding parameter of the full byte coding function, a dependence byte needed for recovering the second byte;
obtain, from a dependence check code block corresponding to a second coding result, a check code needed for recovering the second byte, wherein the second coding result is obtained by coding, using the full byte coding function, the second byte and a dependence byte that is indicated by the second coding parameter; and
decode, according to the dependence byte needed for recovering the second byte, the check code needed for recovering the second byte to obtain the second byte.

9. A data processing apparatus of a distributed storage system comprising a NameNode, a plurality of first storage nodes, and a plurality of second storage nodes, wherein the data processing apparatus comprises:
an input/output (I/O) device configured to receive identifiers of a plurality of target storage nodes and an identifier of a target file from the NameNode, wherein the plurality of target storage nodes comprise stored file blocks of the target file, wherein the plurality of first storage nodes are configured to store file blocks in a distributed manner, wherein the plurality of second storage nodes are configured to store check code blocks obtained by coding the file blocks in the distributed manner, and wherein each of the second storage nodes comprises an instance of the data processing apparatus communicatively coupled to the NameNode;
a memory coupled to the I/O device and configured to store instructions; and
a processor coupled to the I/O device and the memory, wherein the instructions cause the processor to:
code a portion of the file blocks of the target file according to a partial byte coding function and the identifiers to obtain a first check code;
code all of the file blocks of the target file according to a full byte coding function and the identifiers to obtain a second check code; and
store, in storage space of one of the plurality of second storage nodes comprising the data processing apparatus, the first check code and the second check code.

10. The data processing apparatus of claim 9, wherein the instructions further cause the processor to:
  obtain a byte indicated by a first coding parameter of the partial byte coding function from one of the plurality of target storage nodes corresponding to the first coding parameter; and
  code, according to the partial byte coding function, the byte indicated by the first coding parameter to obtain the first check code.

11. The data processing apparatus of claim 9, wherein the instructions further cause the processor to:
  obtain a byte indicated by a second coding parameter of the full byte coding function from one of the plurality of target storage nodes corresponding to the second coding parameter; and
  code, according to the full byte coding function, the byte indicated by the second coding parameter to obtain the second check code.

12. The data processing apparatus of claim 9, wherein the instructions further cause the processor to determine, according to a quantity of target storage nodes received by the I/O device and a quantity of check nodes specified by the NameNode, a quantity of first parameters in the partial byte coding function and a quantity of same first parameters comprised in partial byte coding functions on two proximately adjacent check nodes, and wherein the partial byte coding functions comprised on the two proximately adjacent check nodes have a maximum quantity of overlapped first parameters.

13. A distributed storage system$_T$ comprising=a NameNode, a plurality of first storage nodes, and a plurality of second storage nodes, wherein the plurality of first storage nodes are configured to store file blocks of a file in a distributed manner, the plurality of second storage nodes are configured to store check code blocks obtained by coding the file blocks of the file in the distributed manner, and each of the second storage nodes comprises a data processing apparatus communicatively coupled to the NameNode, and wherein the data processing apparatus is configured to:
  receive identifiers of a plurality of target storage nodes and an identifier of a target file from the NameNode, wherein the plurality of target storage nodes comprise stored file blocks of the target file;
  code a portion of the file blocks of the target file according to a partial byte coding function and the identifiers of the plurality of target storage nodes to obtain a first check code;
  code all of the file blocks of the target file according to a full byte coding function and the identifiers of the plurality of target storage nodes to obtain a second check code; and
  store, in storage space of one plurality of second storage nodes to which the data processing apparatus belongs, the first check code and the second check code.

14. The distributed storage system of claim 13, wherein the data processing apparatus is further configured to:
  obtain a byte indicated by a first coding parameter of the partial byte coding function from one of the plurality of target storage nodes corresponding to the first coding parameter; and
  code, according to the partial byte coding function, the byte indicated by the first coding parameter to obtain the first check code.

15. The distributed storage system of claim 13, wherein the data processing apparatus is further configured to:
  obtain a byte indicated by a second coding parameter of the full byte coding function from one of the plurality of target storage nodes corresponding to the second coding parameter; and
  code, according to the full byte coding function, the byte indicated by the second coding parameter to obtain the second check code.

16. The distributed storage system of claim 13, wherein the data processing apparatus is further configured to determine, according to a quantity of target storage nodes received and a quantity of check nodes specified by the NameNode, a quantity of first parameters in the partial byte coding function and a quantity of same first parameters comprised in partial byte coding functions on two proximately adjacent check nodes, and wherein the partial byte coding functions comprised on the two proximately adjacent check nodes have a maximum quantity of overlapped first parameters.

* * * * *

UNITED STATES PATENT AND TRADEMARK OFFICE
CERTIFICATE OF CORRECTION

PATENT NO. : 10,810,091 B2  
APPLICATION NO. : 15/893201  
DATED : October 20, 2020  
INVENTOR(S) : Shiyue Zhuang Page 1 of 1

It is certified that error appears in the above-identified patent and that said Letters Patent is hereby corrected as shown below:

In the Claims

Claim 5, Column 27, Line 51: "code block wherein" should read "code block, wherein"

Claim 13, Column 29, Line 30: "system$_T$ comprising=a" should read "system comprising a"

Signed and Sealed this  
Seventeenth Day of November, 2020

Andrei Iancu  
*Director of the United States Patent and Trademark Office*